US006434612B1

(12) United States Patent
Hughes et al.

(10) Patent No.: US 6,434,612 B1
(45) Date of Patent: *Aug. 13, 2002

(54) CONNECTION CONTROL INTERFACE FOR ASYNCHRONOUS TRANSFER MODE SWITCHES

(75) Inventors: David A. Hughes, Mountain View; Isaac P. Choi; Radhika Padmanabhan, both of San Jose; Neufito L. Fernandes, Cupertino; William P. Buckley; Jeremy R Lawrence, both of San Jose, all of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,300

(22) Filed: Dec. 10, 1997

(51) Int. Cl.[7] ............................................... G06F 13/00
(52) U.S. Cl. ........................................ 709/223; 709/223
(58) Field of Search ................................ 709/200, 213, 709/217, 218, 220, 223, 226; 379/269, 242, 268

(56) References Cited

U.S. PATENT DOCUMENTS

| | | | |
|---|---|---|---|
| 4,943,999 A | | 7/1990 | Ardon |
| 5,678,006 A | * | 10/1997 | Valizadeh et al. .......... 709/223 |
| 5,787,070 A | | 7/1998 | Gupta et al. |
| 6,008,805 A | | 12/1999 | Land et al. |
| 6,034,945 A | | 3/2000 | Hughes et al. |
| 6,097,807 A | * | 8/2000 | Leslie et al. ................ 379/269 |
| 6,185,222 B1 | | 2/2001 | Hughes |

OTHER PUBLICATIONS

Louis Fourie, "Switch Management Interface Functional Specification," Revision 1.1, pp. 1–33 (Apr. 25, 1996).
Statcom BPX Reference Manual, Release 8.2 EQA Draft (May 1996).
T. Brown, "Definitions of Managed Objects for the SONET/SDH Interface Type," Internet Engineering Task Force RFC 1595, Mar. 1994.
P. Almquist . et al., "Type of Service in the Internet Protocol Suite," Internet Engineering Task Force RFC 1349, Jul. 1992.

(List continued on next page.)

Primary Examiner—Robert B. Harrell
(74) Attorney, Agent, or Firm—Blakely, Sokoloff, Taylor & Zafman LLP

(57) ABSTRACT

A connection control interface for switches in a network is provided. The connection control interface allows the multiservice switch to provide a number of switch resource partitions to a number of independent controllers coupled to the switch. The switch resource partitions comprise a number of subsets of switch resources that define a number of independent subset networks of a physical network. The connection control interface allows the independent controllers to control the connections of the switch using the number of switch resource partitions. The independent controllers each use one of a number of control systems, the control systems comprising a network software level. The independent controllers comprise a virtual switch interface having a master component and a slave component where the master and slave components may be hosted on different processors. The slave components may be hosted on a control card that controls a number of port cards of the switch or on a port card processor. The switch and the independent controllers are resynchronized when discrepancies are detected between the connections on the switch and those expected by the each of the plurality of independent controllers.

68 Claims, 15 Drawing Sheets

OTHER PUBLICATIONS

P. Newman et al., "Ipsilon's General Switch Management Protocol Specification, Version 1.1," Internet Engineering Task Force RFC 1987, Aug. 1996.

P. Newman et al., "General Switch Management Protocol Specification, Version 1.1," Internet Engineering Task Force, Draft Jun. 1996.

The ATM Forum Technical Committee, "Integrated Logal Management Interface (ILMI) Specification, Version 4.0," ATM Forum document No. af–ilmi–0065.000, Sep. 1996.

M. Ahmed et al., "Definitions of Managed Objects for ATM Management Version 8.0 using SMIv2," Internet Engineering Task Force RFC 1695, Aug. 1994.

J. Case et al., "Structure of Management Information for Version 2 of the Simple Network Management Protocol (SNMPV2)," Internet Engineering Task Force RFC 1902, Jan. 1996.

Genda, K. et al: "A 160 GB/s ATM Switch Using Internal Speed–up Crossbar Switch Architecture" Electronics and Communications in Japan, Part 1—Communications, vol. 80, No. 9, Sep. 1997, pp. 68–78.

Veeraraghavan M. et al.: "Parallel Connection Control (PCC) Algorithm for ATM Networks," 1996 IEEE International Conference on Communications (ICC), Converging Technologies for Tomorrow's Applications, Dallas, Jun. 23–27, 1996, vol. 3, Jun. 22, 1996, pp. 1635–1641.

Brown, T.F.: "Distributed Control of A Broadband Local Access Switch," World Prosperity Through Communications, Boston, Jun. 11–14, 1989, vol. 3, Jun. 11, 1989, pp. 1221–1225.

Fumito, Sato et al.: "Functional Elements For Switching Software Based on Object–oriented Paradigm with UPT As An Example," IEICE Transactions on Communications, vol. E75–B, No. 10, Oct. 1, 1992, pp. 1052–1060.

International Search Report mailed Mar. 26, 1999 for Counterpart PCT application No. PCT/US98/23433.

* cited by examiner

CONNECTION CONTROL INTERFACE FOR ASYNCHRONOUS TRANSFER MODE SWITCHES

FIELD OF THE INVENTION

The present invention relates generally to the management of network nodes and more particularly to a mechanism for allowing communication and control of a multiservice switch in a network.

BACKGROUND OF THE INVENTION

Multiservice network switches such as the BPX™ sold by Cisco Systems, Inc. of San Jose, Calif., are used to provide a data path, or interface, between multiple networks, each of which may operate according to a different networking standard protocol. Examples of the networking protocols supported by these multiservice switches include, but are not limited to, frame relay, voice, circuit emulation, T1 channelized, T3 channelized, and Asynchronous Transfer Mode (ATM). FIG. 1 is a prior art network 1500 of switches comprising connection control processes on the switches communicating with each other and then setting up connections through the switches. This network 1500 comprises a number of switches 1502–1508 that are connected using port cards 1532–1546 and trunks 1548–1554. Each switch comprises a control card 1512–1518, and each control card comprises a connection routing processor 1522–1528, respectively. A connection routing protocol communicates between connection routing processors 1522–1528. A command line interface is used to input a request for an end-to-end connection in one switch. Different connections may be requested in different switches. Connection routing processors on different switches communicate with each other to set up an end-to-end connection by building the connection out of virtual circuits on the trunks 1548–1554 and cross-connects on the switches 1502–1508.

FIG. 2 shows a prior art network switch 100 that is a node of a network. Network switch 100 generally comprises a data path 125 and command bus 127 to which a controller 105, a trunk module 110, or port, and service modules 115 and 120, or ports, may be coupled. Trunk module 110 connects network switch 100 to other switches, or nodes, of the network.

Service modules 115 and 120 are coupled to customer premise equipment (CPE) B and CPE C, respectively. The trunk and service modules may be configured in a number of different ways to allow communication between trunk A, CPE B, and CPE C via data path 125.

Controller 105 generally performs control functions for a single network switch 100 using command bus 127. Controller 105 controls the switch 100 using a configuration database 106 comprising switch control code, a connection routing protocol 107, and switch resource management software 108. The configuration database 106 contains information regarding each of the trunk and service modules, including the configuration and capabilities of each trunk and service module. Controller 105 also provides a user interface 135 that allows a user access to and control of network switch 100. The configuration database 106 runs on the controller 105 and the user interface 135 writes to the configuration database 106. The user interface 135 is also used to configure the switch 100 and the connection routing protocol 107.

The switch resource management function 108 establishes and deestablishes switch connections under the control of the controller 105.

Controller 105 treats network switch 100 as a single network node, addressing all communications destined for network switch 100 to the network address of network switch 100. Controller 105 receives and processes connection routing protocol messages and determines which local resources are affected by the protocol message. If the protocol message affects a resource of network switch 100 that is not present on controller 105, controller 105 translates the configuration information originally contained in the protocol message to a format suitable for use by the target trunk or service module.

Controller 105 then transfers the translated configuration information to the target trunk or service module using command bus 127. The target trunk or service module receives and processes the configuration information, and the target trunk or service module indicates completion of configuration operations to controller 105 using command bus 127.

In this prior art switch and controller arrangement, only a single controller, also referred to as a master, supporting a single network software layer is allowed control of the resources of the switch. A major disadvantage of this prior art switch and controller arrangement is that the single controller is limited to supporting a single network connection routing protocol which limits the control of all of the resources of the switch to the single configuration supported by the connection routing protocol.

There was also a disadvantage in the typical prior art switch and controller arrangement in that the controller typically could not be isolated from the switch. The prior art controller was tied to the particular parameters for a particular interface and the way the switch represented those parameters internally. As these parameters typically varied from switch to switch, this would typically mean that the controller was tied to or associated with particular parameters for an interface making the controller software specific to a switch and the representation by the switch of Quality of Service (QoS) and interface parameters. Therefore, there was no way to have the same controller software, and thus the same controller, support other switches as these other switches had a completely different set of QoS and interface parameters. Furthermore, a prior art controller designed to support a particular switch having particular interface types could not support a different switch with different interface types; for example, a controller designed for a switch having only ATM interfaces could not support a switch with frame relay interfaces. Thus, a disadvantage of the prior art is that there is no clear separation between standard QoS parameters and switch specific parameters for the way the QoS is represented in the switch.

The Quality of Service (QoS) associated with a network switch defines the user-oriented end-to-end performance of ATM networks, and is defined using particular parameters and reference configurations. The switch manufacturer or network provider state the QoS performance objectives in terms of a particular type or class of QoS. A network connection may be requested by a controller using a particular available service class, along with the parameters corresponding to that class. Another major disadvantage of prior art switch and controller arrangements is that prior art connection control methods each allowed the QoS for connections to be specified only in a narrow set of ways. For example, QoS can be specified in terms of one of the following classes of service: ATM Forum Service Categories; priority fields or Internet Protocol (IP) Type of Service; or, service types that are proprietary to a switch manufacturer.

Furthermore, a major disadvantage of the prior art switch and controller arrangements is that there is no reliably fast way to check for errors in connections between the controller and a switch. Prior art switch connection control protocols maintain synchronization between the controller's expectations of the connections present on a switch, and what is actually on the switch. One prior art synchronization technique involves the controller requesting details of each connection on the switch individually, checking each connection with the controller records of the connection, and correcting each discrepancy. Another prior art synchronization technique involves each connection on the switch timing out every 20 minutes, thereby forcing the controller to re-download all switch connections every 20 minutes.

Moreover, a disadvantage of the prior art switch and controller arrangement is that prior art connection protocols do not support distributed processing thereby requiring connection control messages to be sent to a single point on the associated switch. This creates a bottleneck in communications. These disadvantages complicate the task of managing and controlling a network switch and limit the flexibility and performance scalability of the network.

SUMMARY AND OBJECTS OF THE INVENTION

It is therefore an object of the invention to allow multiple independent controllers, each supporting different control systems, to simultaneously control a network switch by partitioning switch resources.

It is a further object of the invention to support network connections having a multiple and expandable number of Quality of Service classes.

It is a further object of the invention to support quick resynchronization of switch and controller connections that are in error without re-downloading all switch connections.

It is a further object of the invention to make the use of distributed connection processing feasible.

It is a further object of the invention to control a network switch with a mixture of interface types and speeds.

It is a further object of the invention to allow extensions in a network switch to be accessed via one or more service templates.

These and other objects of the invention are provided by a connection control interface for a switch in a network. The connection control interface allows the switch to provide a number of switch resource partitions to a number of independent controllers coupled to the switch. The switch resource partitions may comprise a number of subsets of switch resources that define a number of independent subset networks of a physical network. The connection control interface allows the independent controllers to control the connections of the switch using the number of switch resource partitions.

The switch and the independent controllers are resynchronized when discrepancies are detected between the connections on the switch and those expected by the each of the plurality of independent controllers.

The independent controllers each use one of a number of control systems, the control systems comprising a network software level. The independent controllers together with the virtual switch interface software on the switch comprise a virtual switch interface having a master component and a slave component where the master and slave components may be hosted on different processors. The slave components may be hosted on a control card that controls a number of port cards of the switch. Moreover, the slave components may be hosted on a port card processor.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A multiservice switch can be divided into hardware architecture and software architecture. The hardware architecture is divided into the switch core and the switch interface. The switch core performs the switching of cells. The switch interface performs the external input and output functions by adapting between the access devices and the switch core whenever needed. In an Asynchronous Transfer Mode (ATM) interface, for example, the bit rate and format of ATM cells are adapted by the switch interface to fit the switch core. Furthermore, most functions that handle ATM cell labeling reside in the switch interface, including virtual path identifier/virtual channel identifier (VPI/VCI) assignment, addition of routing information to cells, and discarding cells when needed. In other types of interfaces that are not ATM interfaces, for example frame relay, voice, data, and circuit emulation, the interfaces perform a similar adaptation function between the switch input and output functions.

The multiservice communications switch is controlled and supervised by software. A virtual switch interface (VSI) is provided herein that allows an arbitrary number of completely independent controllers to control an arbitrary number of completely independent subsets of the resources of a switch. An arbitrary number of controllers can control each switch. The controllers on a number of switches belong to an arbitrary number of distinct groups, although generally not more than one controller on each switch will belong to each group; the exception is when a standby controller is provided as a backup for an active controller. The controllers of each separate group see completely independent subsets of a physical network. This VSI allows for partitioning of switch resources to allow simultaneous control of a switch by multiple independent controllers. Furthermore, this VSI provides a clean interface for setting up switch connections and virtual channels or circuits, so that portable software for network layers and above may be written independently of any particular switch. Separating the function of connection routing from the function of establishing connections allows the establishment of connections to be distributed across multiple port cards of a switch. The VSI described herein can be used on packet or cell switching cores having multiservice interfaces. Therefore, in allowing for multiple types of interfaces to be used with multiple types of switch cores, the VSI allows for the use of non-ATM interfaces with ATM switches, the use of ATM or non-ATM interfaces on packet switches, and the use of non-ATM interfaces on circuit switches.

Figure 1:
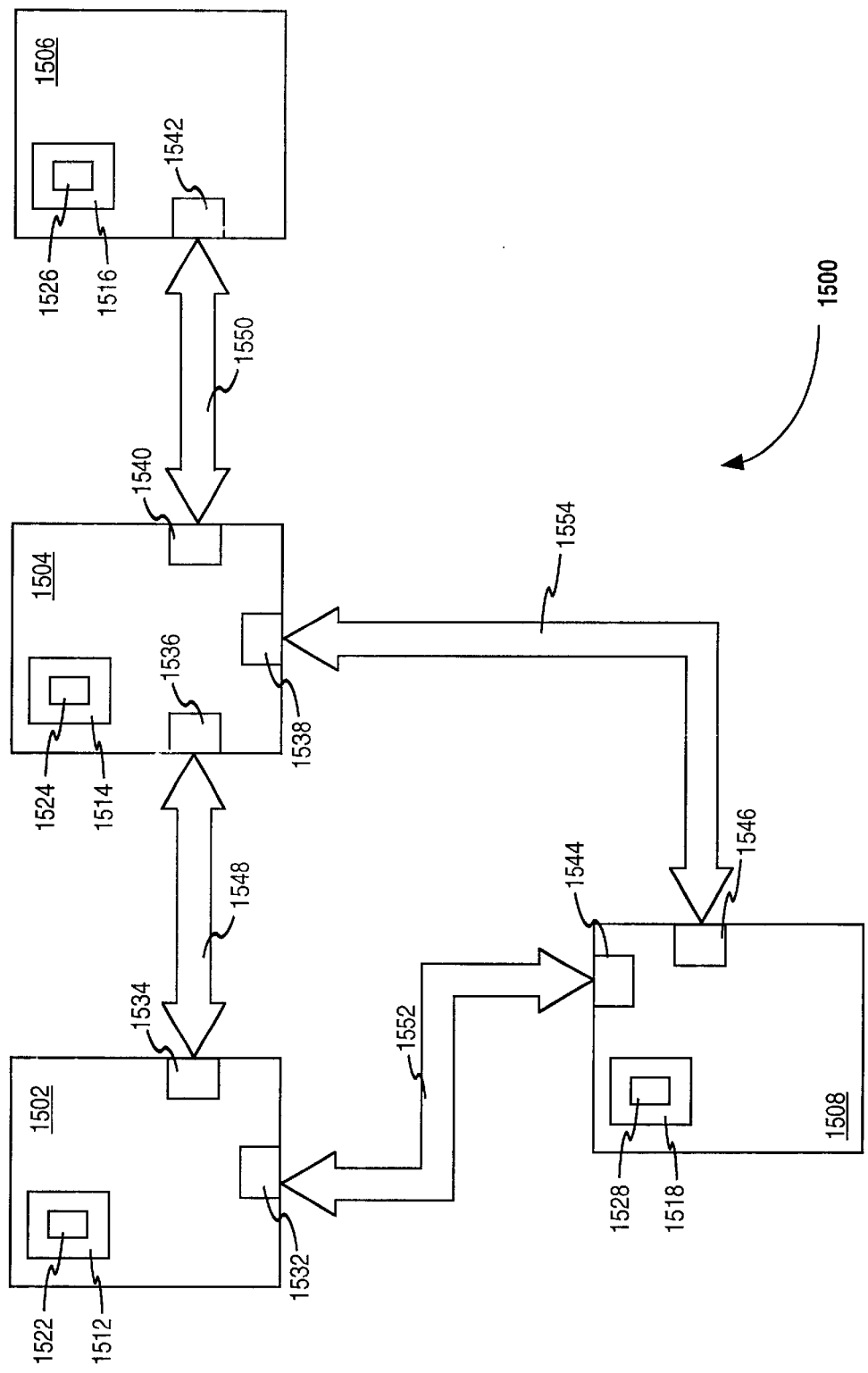
FIG. 1 is a prior art network of switches.
Figure 2:
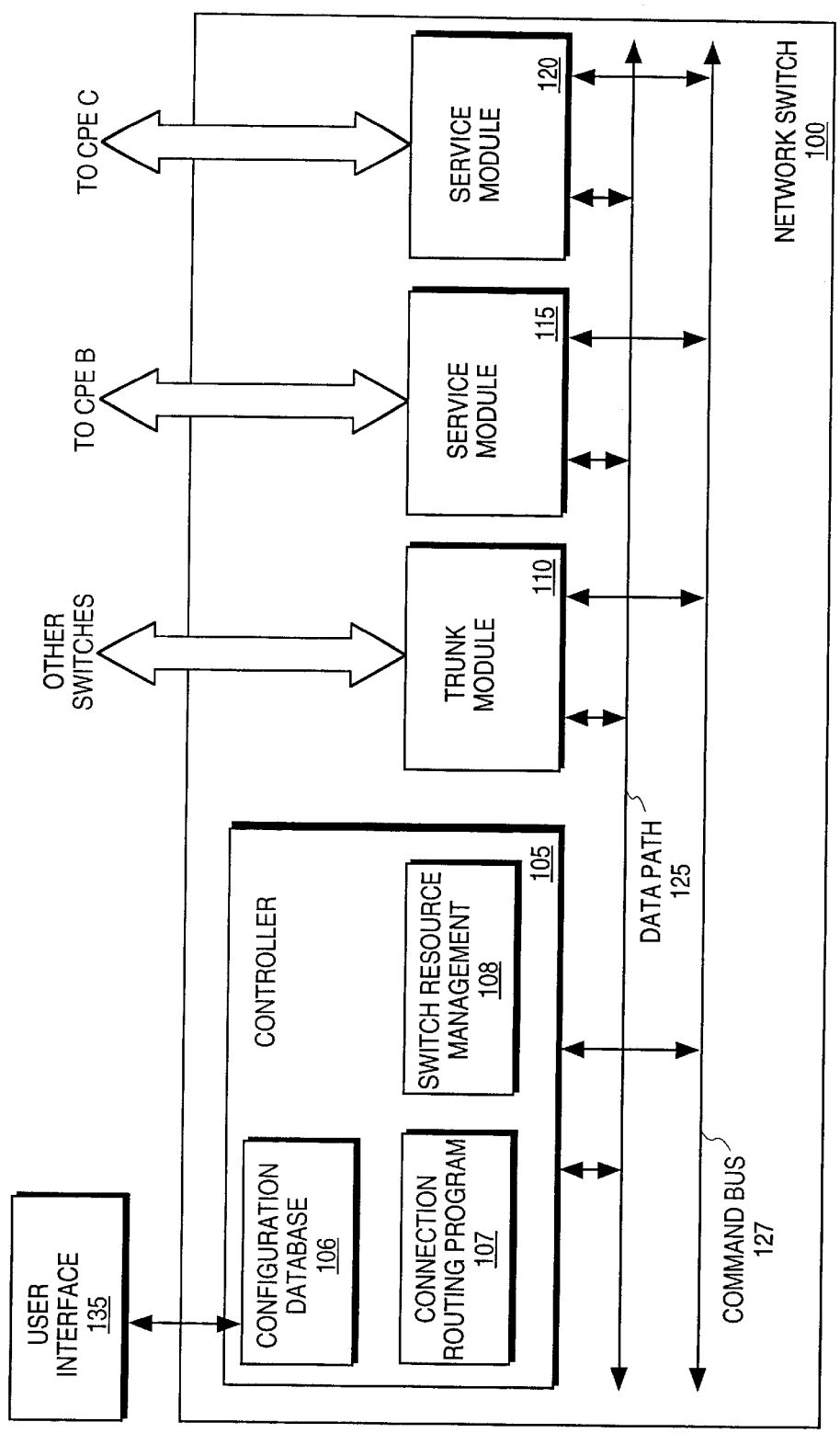
FIG. 2 is a prior art network switch that is a node of a network.
Figure 3:
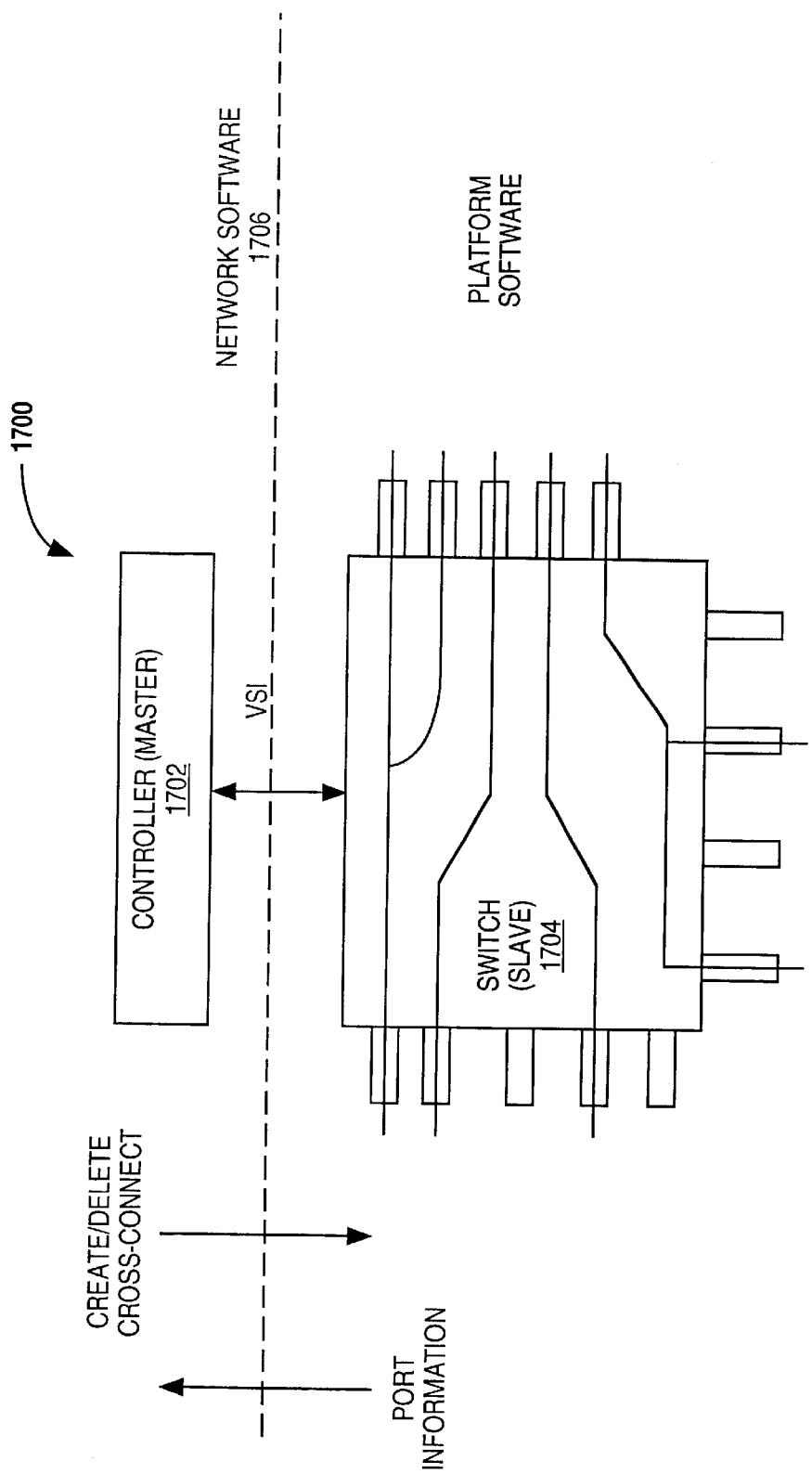
FIG. 3 is the control model of one embodiment for a network node consisting of controller and switch components based on the concept of separation between network information and specific hardware information.

FIG. 3 is the control model 1700 of one embodiment for a network node consisting of controller 1702 and switch 1704 components based on the concept of separation between network information 1706 and specific hardware information. These components may be software modules running on the same hardware platform or they may run on different specialized hardware platforms. The controller components deal with the specifics of the network, for example network topology, protocols, and connection routing. The controller components assume a generic view of the switch; logical interfaces with generic resources. The switch component deals with the specifics of the hardware, for example hidden resource mappings and restrictions and how to build connection segments. The switch component knows nothing of the end-to-end nature of the network connections. This control model yields two paths of information flow: connection requests from the controller to the switch; and interface and other switch information from the switch to the controller.

Within a switch there are two models, and these two models may be combined into a third hybrid model. A centralized slave model has a single point of control for making connections and controlling interfaces, while a distributed slave model allows for multiple slaves to coexist. In the distributed slave case, interfaces are each owned by a single slave and connection requests may need to go to two slaves to satisfy the request. In this case the controller requests the connection from either of the slaves which control one of the interfaces and that slave communicates to the other slave before responding to the master.

Figure 4:
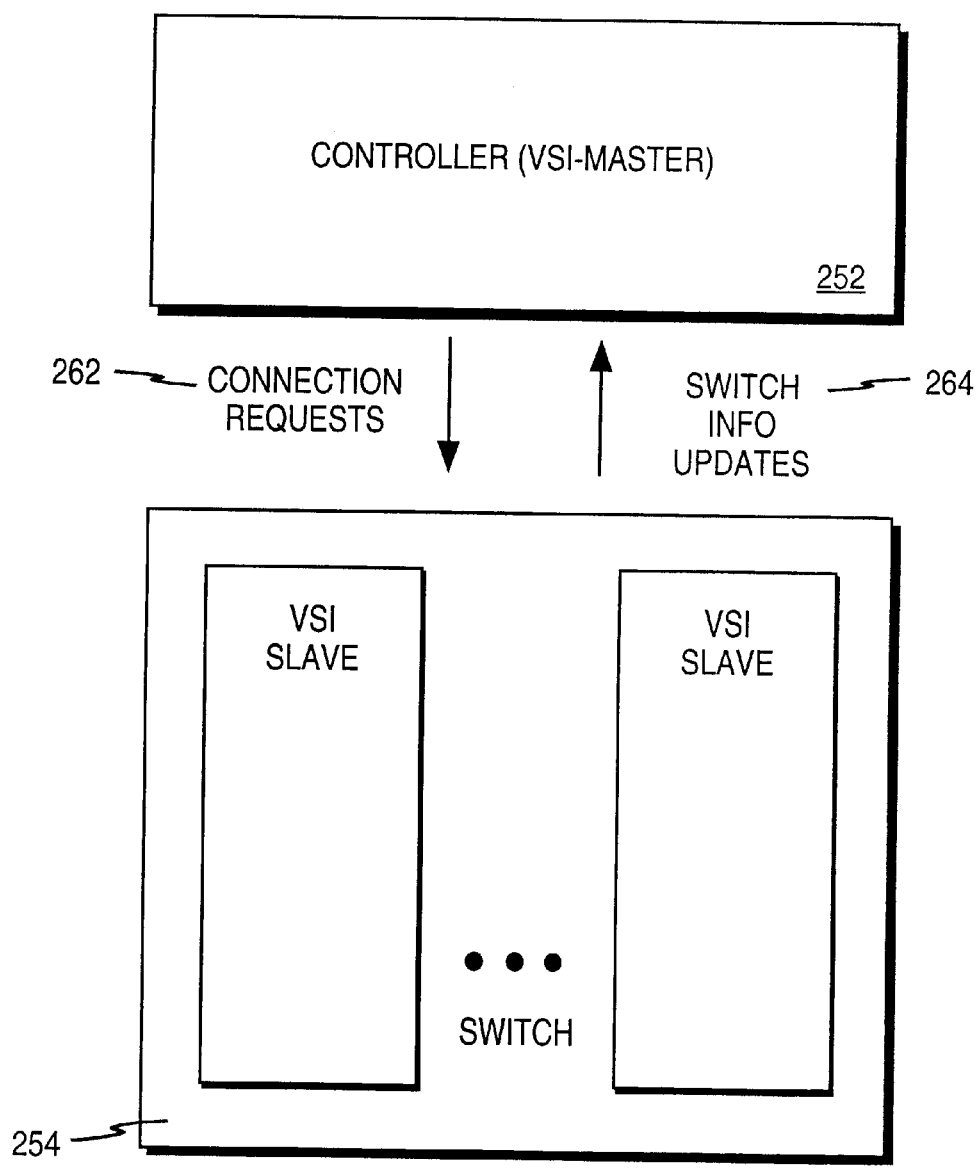
FIG. 4 is the basic model for establishing connections between a controller and a switch in one embodiment.

FIG. 4 is the basic model for establishing connections between a controller and a switch in one embodiment. The basic model for connections is that the controller 252, of which there may be one or more, requests 262 the switch 254 to create, delete, and change connections. The controller 252, which is not required to be present in the switch, may reside on an external computer or may reside in a processor or multiple processors of the switch. The switch 254 may accept or reject the requests 262 based on resource availability. The switch 254 is required to respond to the controller 252 with a message 264 indicating the outcome. The controller 252 is required to get an explicit reply for all requests or take appropriate action if the response is not received within a time-out period.

The switch is responsible for notifying the controllers of changes to its synchronization state and changes to its interfaces. These changes may be due to loading changes, state changes, or existence (addition/deletion) changes.

The switch is required to get an explicit reply from the controller that a change notification was received. The switch notifies the controller of the current state of interfaces, even if the interface may have changed state multiple times since the last notification was sent.

Figure 5:
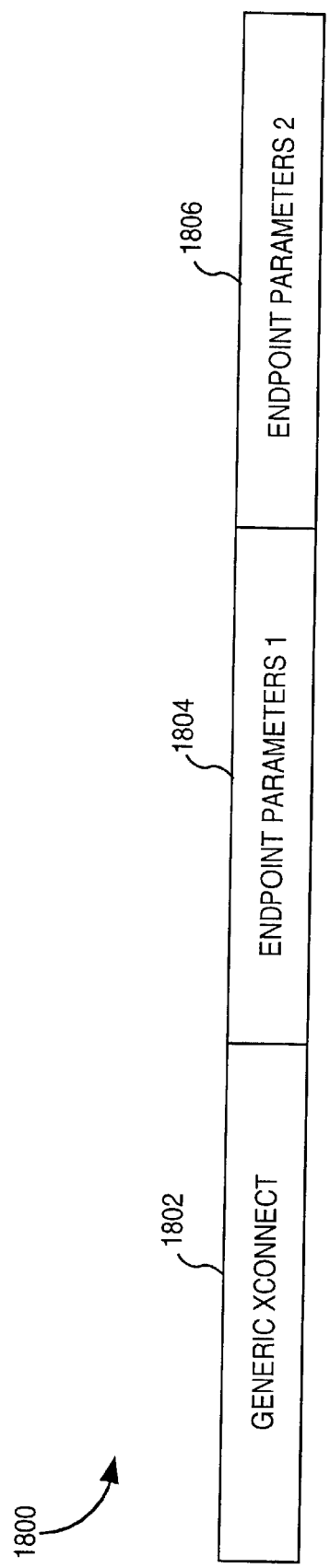
FIG. 5 is a three-piece message format of one embodiment.

FIG. 5 is a three-piece message format 1800 of one embodiment. This message format provides for the control of a switch with a mixture of interface types and speeds by distinguishing between generic connection information and endpoint specific information. The generic cross-connect portion 1802 of the message contains, but is not limited to virtual circuit information, QoS parameters, and connection class identifiers. The endpoint parameter 1 portion 1804 of the message contains specific information for a first type of endpoint. The endpoint parameter 2 portion 1806 of the message contains specific information for a second type endpoint. In this manner different interface types and speeds can be supported on a single switch, the interfaces including, but not limited to, T1, T3, OC3, and OC12 ATM interfaces as well as nxDSO, T1, T3, frame relay, DO compressed voice, and circuit emulation interfaces. Furthermore, connections may be made between interfaces of different types.

The VSI of one embodiment defines the messages and associated functions which allow communication between the controller and the switch. This interface is expected to support all types of virtual circuit connections. The connections supported include, but are not limited to, voice, data, frame relay, circuit emulation, T1 channelized, T3 channelized, and ATM standard switched permanent virtual circuits and switched virtual circuits. The interface types may be ATM and non-ATM, including different types of interfaces for each type of endpoint, for example, voice-to-ATM connections and voice-to-voice connections. In addition, the VSI is defined as hardware independent so many types of switches may support the VSI. Moreover, in general, there are several embodiments using the virtual switch interface between a controller and a switch. These embodiments are now generally described with reference to FIGS. 6–9.

Figure 6:
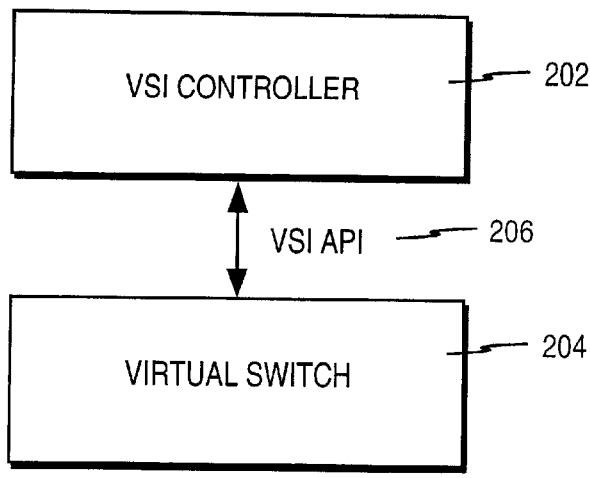
FIG. 6 is the virtual switch interface (VSI) as seen from a master in one embodiment.

FIG. 6 is the virtual switch interface (VSI) as seen from a controller in one embodiment. A controller 202 perceives that it is controlling a virtual switch 204 via the VSI application programmer's interface (API) 206. Therefore, the controller 202 needs no awareness of the actions of other controllers. The API 206 allows the controller 202 to discover the configuration of the interfaces on the switch and to be informed of changes.

The API 206 also allows the controller 202 to establish and break cross-connects with given Quality of Service (QoS) parameters. The controller includes, but is not limited to, automatic routing controllers, tag switch controllers implementing tag distribution protocol and an Internet Protocol (IP) routing protocol, signaling system number 7 (CCS7) controllers, AutoRoute™ controllers, private network-to-network interface (PNNI) controllers, and multiprotocol label switching controllers. The VSI can be run over any physical interface including, but not limited to, an ATM network, the ethernet, or within a central processing unit.

Figure 7:
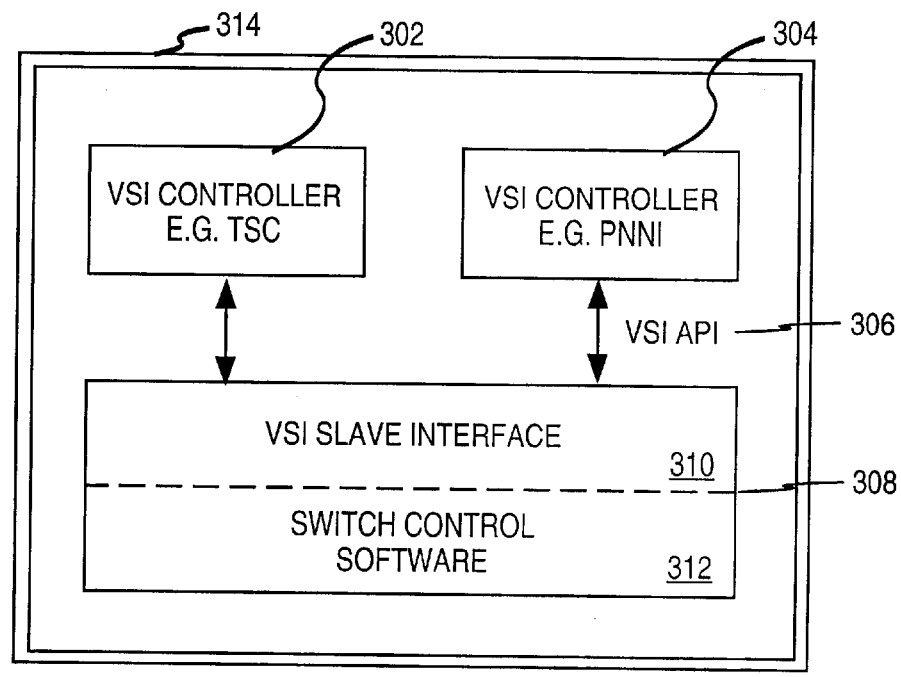
FIG. 7 shows multiple VSI controllers on a VSI switch control processor in one embodiment.

FIG. 7 shows multiple VSI controllers on a VSI switch control processor in one embodiment. This configuration allows multiple controllers 302 and 304 to control the VSI slave switch 308 via the API 306 with each controller 302 and 304 seeing a virtual switch with unique properties. The controllers 302 and 304 and the slave switch 308 are hosted on a single processor 314 in this embodiment, but are not so limited. The controllers 302 and 304 in this embodiment are depicted as, but not limited to, a tag switch controller and a PNNI controller, respectively. The VSI slave switch 308 is comprised of the VSI slave interface 310 and the switch control software 312. As a result, not all controllers may control all interfaces because each controller is presented a view of a switch having a particular set of logical interfaces. The logical interfaces are either physical interfaces or virtual interfaces, and the sets of logical interfaces presented to different controllers will differ. Because the VSI slave interface 310 takes care of the interactions between the controllers 302 and 304 in a manner that ensures that controllers 302 and 304 cannot interfere with each other, no communication between the controllers 302 and 304 is required.

In general, there will be multiple controllers controlling connections on each logical interface. The VSI slave switch will partition virtual path identifier (VPI) and virtual channel identifier (VCI) space between the controllers so that each master perceives an interface with a limited usable range of VPI/VCI space. Moreover, cross-connect space can be shared and partitioned between the various controllers resulting in each controller seeing a switch where the available cross-connects vary by causes unknown. This can be extended to multiservice interfaces, for example data link channel identifiers (DLCIs) of frame relay interfaces can be mapped to VCI.

Furthermore, bandwidth on the interface is shared between controllers. For purposes of connection admission control, the VSI slave includes, but is not limited to, two allocation schemes for bandwidth allocation. In one allocation scheme, the VSI slave can allocate a fixed partition of bandwidth to each controller in which case each controller perceives that each logical interface has a bandwidth that is fixed but lower than the physical port bandwidth. In another allocation scheme, the VSI slave can dynamically share bandwidth between the controllers. In this case, each controller perceives that the available bandwidth on an interface varies because of causes unknown, but that the switch is always able to guarantee the QoS for connections that are accepted.

Figure 8:
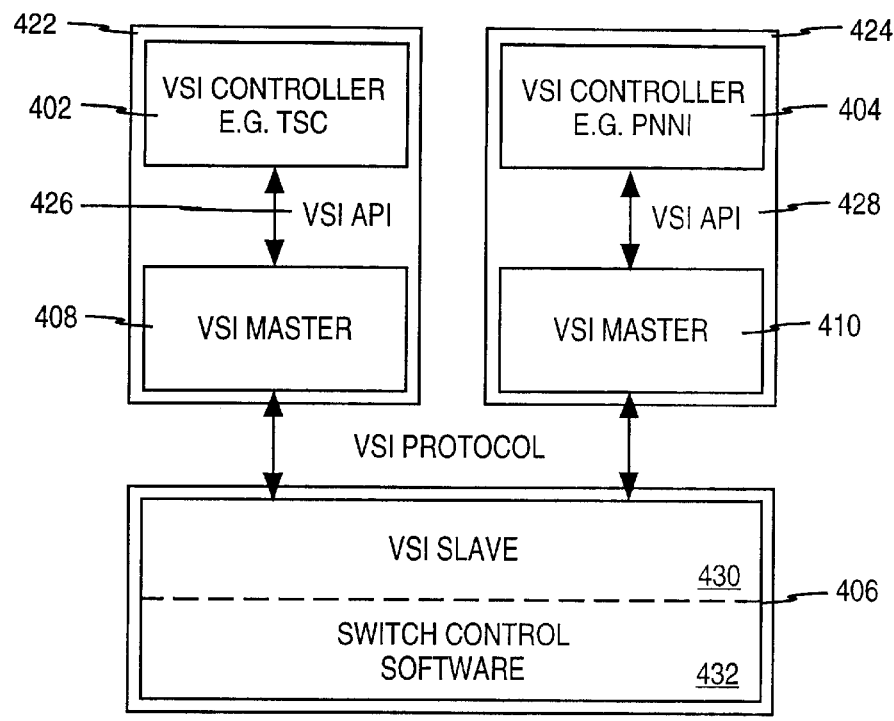
FIG. 8 shows multiple VSI controllers and VSI switch control on different processors in one embodiment.

FIG. 8 shows multiple VSI controllers and VSI switch control on different processors in one embodiment. In the multiple controller model illustrated, two controllers are shown but the embodiment is not so limited.

Any or all of the multiple controllers may run on the same processor as the switch, but the embodiment is not so limited. In this embodiment, each VSI controller 402 and 404 resides on a separate processor 422 and 424, respectively. Each of the independent controllers 402 and 404 is running a VSI-master component 408 and 410, respectively, of the VSI. Each VSI controller 402 and 404 controls a virtual switch 406 via a VSI API 426 and 428, respectively, but the API is provided by a VSI master 408 and 410, respectively.

The switch 406 is running the VSI-slave component 430 of the VSI. The VSI-slave component 430 together with the two VSI-master components 408 and 410 comprises the VSI. The VSI master 408 and 410 translates VSI API calls to VSI protocol messages. The VSI protocol messages are transferred between the VSI masters 408 and 410 and the VSI slave 430 of the switch 406, which also resides on a separate processor 432.

Figure 9:
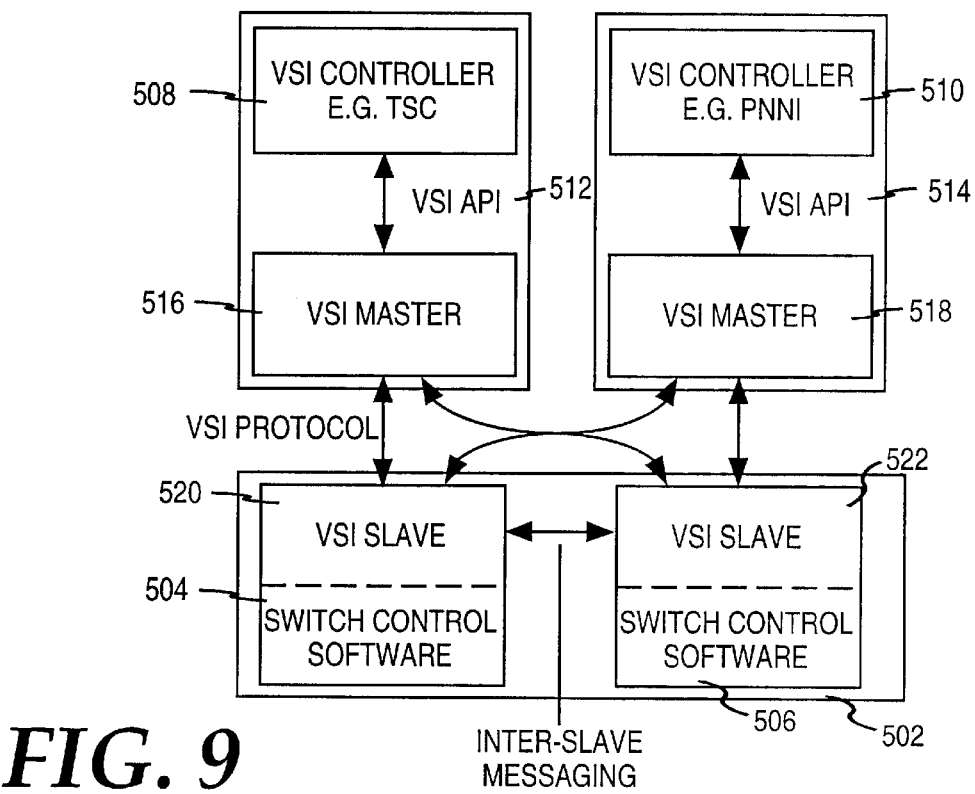
FIG. 9 is a multiple slave model of one embodiment.

An extension of the concept of having masters and slaves on different processors is a distributed slave interface. The distributed slave model allows for increased performance by making use of the distributed connection processing capability in switches. FIG. 9 is a distributed slave model of one embodiment. In the multiple slave interface, a single switch 502 has multiple slaves 520 and 522 where one multiple slave is present on each of a number of port cards. Each of the controllers 508 and 510 still sees a single virtual switch 502 through the VSI APIs 512 and 514, respectively, but the VSI masters 516 and 518, respectively, are aware that there are multiple slaves 520 and 522 on the switch and that messages should be routed via one of several VSI protocol interfaces. In general, there will be one or more preferred slaves for each VSI message, depending on the logical interfaces involved. The slaves may communicate with each other as necessary for connection establishment.

In the multiple slave model illustrated, two distributed slaves 520 and 522 are shown in a single switch 502, but the embodiment is not so limited. A controller may run on the same processor as the switch, but the embodiment is not so limited. The multiple distributed slaves 520 and 522 may be, but are not limited to being, individual processors on individual port cards of a switch. The controller runs the VSI-master components 516 and 518 of the VSI, and each of the distributed slaves runs the VSI-slave components 520 and 522 of the VSI. The VSI-master components 516 and 518 together with the multiple VSI-slave components 520 and 522 comprise the VSI.

Figure 10:
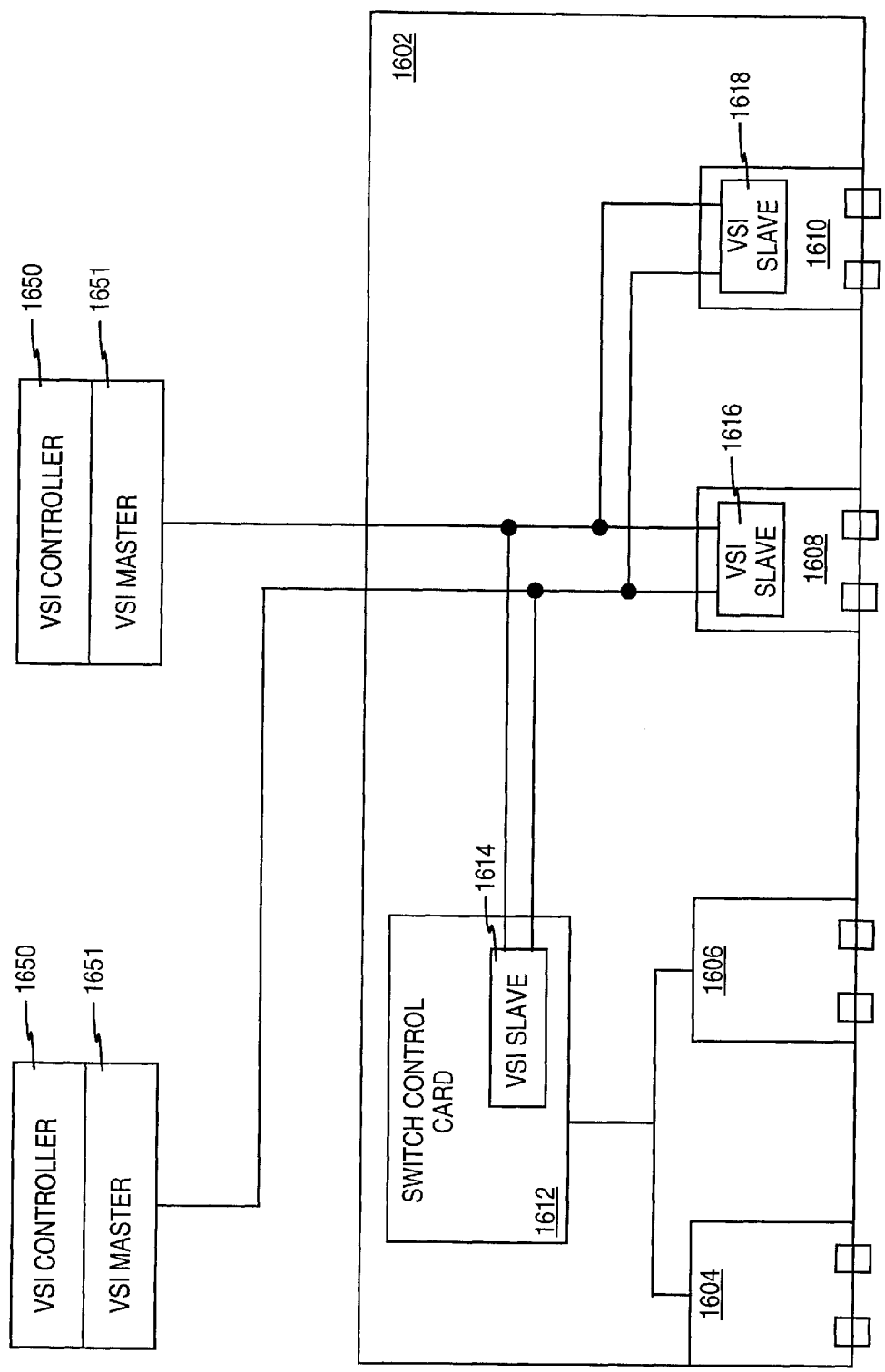
FIG. 10 is a hybrid slave model of one embodiment.

FIG. 10 is a hybrid slave model of one embodiment. As previously discussed, the centralized model uses one VSI to control multiple "dumb" port cards, or port cards without processors located on the part card; therefore, the "dumb" port cards are controlled by a slave that is not located on the port card. The distributed model uses separate VSI slave processors that are located on each of a number of "smart" port cards, or port cards having processors located on the port card. The hybrid slave model is a hybrid of the centralized model and the distributed model in that a switch has some mixture of "smart" port cards and "dumb" port cards.

In the hybrid model of one embodiment, a switch 1602 comprises "dumb" port cards 1604 and 1606 and "smart" port cards 1608 and 1610. The switch 1602 of one embodiment comprises two "dumb" port cards controlled by a single VSI slave, but is not so limited. The switch 1602 shown also comprises two "smart" port cards, but is not so limited. The "dumb" port cards 1604 and 1606 are controlled by a VSI slave 1614 on a switch control card 1612. The VSI slave 1614 can be controlled by VSI controller 1650 comprising VSI master 1651, and VSI controller 1652 comprising VSI master 1653. The "smart" port cards 1608 and 1610 have VSI slave processors 1616 and 1618, respectively, located on the cards. The VSI slave processors 1616 and 1618 can be controlled by VSI controller 1650 comprising VSI master 1651, and VSI 5 controller 1652 comprising VSI master 1653.

Figure 11:
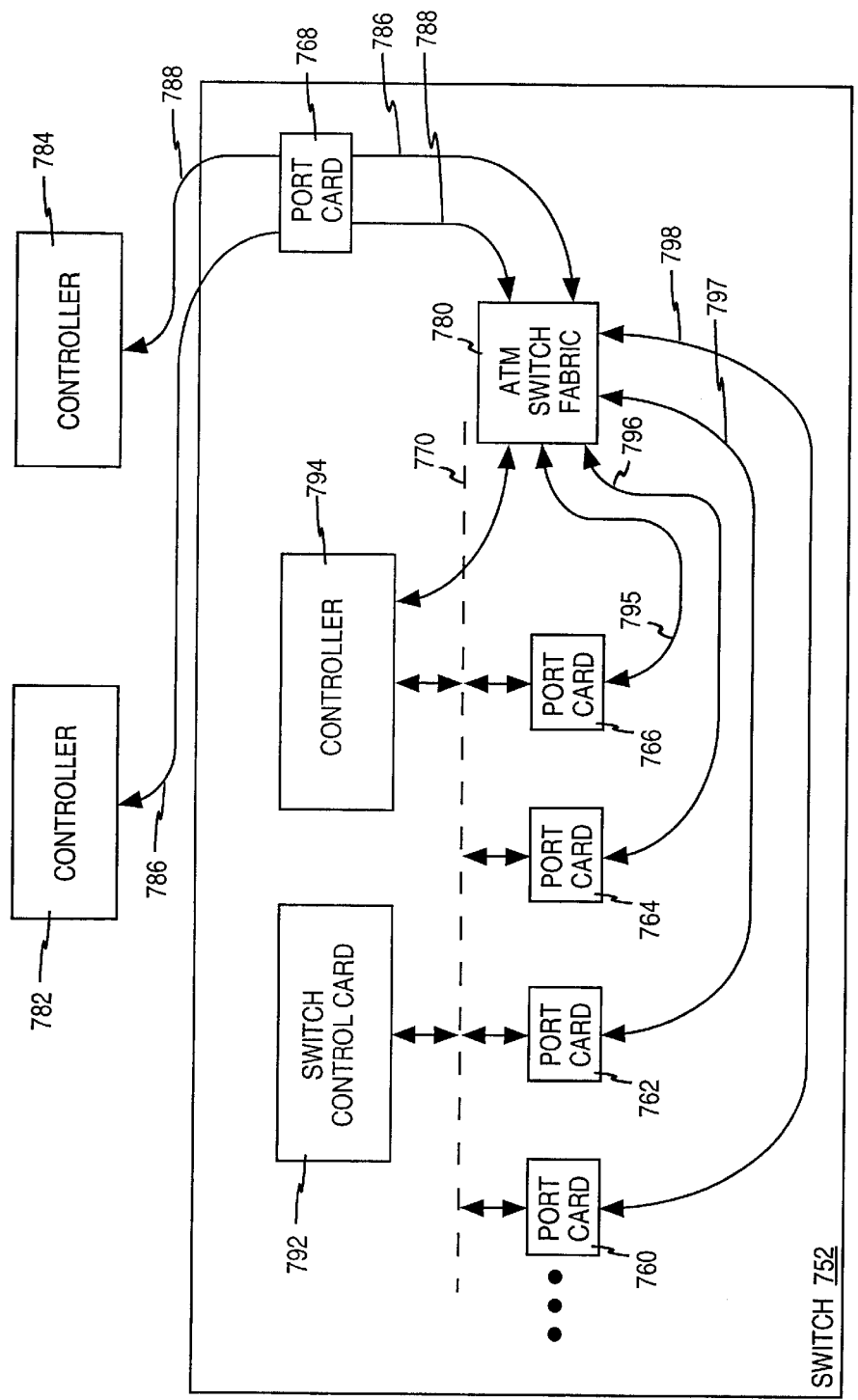
FIG. 11 is the physical VSI implementation between a switch and controllers in one embodiment.

FIG. 11 is the physical VSI implementation between a switch and controllers in one embodiment. A VSI slave exists on each port card 760–768 of a switch 752. The port cards 760–768 are coupled to an internal control bus 770 of the switch 752. A switch control card 792 and a controller 794 are also coupled to the internal control bus 770. Inter-slave messaging is transported through a mesh of switch connections (not shown). The VSI controllers 782 and 784 are attached to the switch 752 via port card 768 and via ATM interfaces on a port card 768. Switch connections also connect each of the VSI controllers 782 and 784 to each slave of each port card 760–768. The ATM interfaces comprise ATM virtual channels 786 and 788 that couple the controllers 782 and 784 to ATM switch fabric 780. The virtual channels 786 and 788 carry VSI messages to the switch 752. The ATM switch fabric 780 is coupled to each of the port cards 760–766 via ATM switch legs 795–798. The ATM switch legs 795–798 carry VSI messages to the port cards 760–766.

In operation, the switch control card 792 writes details of the configuration of interfaces and the configuration of other VSI slaves to each VSI slave of each port card 760–768 using internal control bus messages. The VSI slaves are then enabled to inform the controllers 782, 784, and 794 as to the configuration of the interfaces controlled by each slave.

The VSI consists of the two software components in one embodiment: a VSI-slave running on the switch; and a VSI-master which may run on the switch or on a dedicated controller platform. The VSI-slave is the slave module that manages some of the interfaces for the switch and communicates with other slaves in the switch to set up connections. The VSI-master performs the interface to the higher layer networking software and handles all VSI related functions.

The functions performed by the controller of one embodiment include general controller functions and VSI-related controller functions. As for the general controller (VSI-master) functions, the controller communicates with other controllers to learn and distribute network topology and loading. The controller performs end-to-end route selection for calls, including general call acceptance. The controller also communicates with other controllers to perform call setup. Furthermore, the controller performs local call setup signaling protocols including switched permanent virtual circuit management.

In addition to the general controller functions, each controller performs VSI-related controller functions. The controller requests local connection segment setup, activate, and teardown from switches. The controller manages VPI/VCIs and data link connection identifiers from port and trunk interfaces. The controller manages the subset of these resources as allocated to it by the VSI slave. The controller also updates local loading of the controller as information updates occur from the local switch. Moreover, the controller manages connection segment synchronization with the corresponding switch. Furthermore, the controller performs keep-alive polling of each corresponding slave.

The functions performed by the switch of one embodiment include general switch functions and VSI-related switch functions. As for the general switch (VSI-slave) functions, the switch manages channel allocation, bandwidth, and configuration of interfaces. The switch manages the administrative, operational state of port and trunk interfaces. The switch also manages persistent endpoints, including conditioning. Moreover, the switch collects statistics for connection endpoints. Furthermore, the switch manages card redundancy within the switch for interface cards and central control cards.

In addition to the general switch functions, each switch performs VSI-related switch functions. The switch responds to connection segment requests from controllers. The switch performs specific call acceptance for calls. The switch also notifies controllers of changes to switch interfaces. Moreover, the switch provides switch resource views or partitions to controllers. Furthermore, the switch communicates with other VSI-slaves in a distributed system. The switch does maintain a session identification.

In the distributed model the slaves have additional functions that they perform that are VSI-related functions. The distributed slave communicates with other slaves for connection setup. The distributed slave also maintains a mapping of interfaces-to-slaves. Additionally, the distributed slave maintains individual session-ids per slave.

The VSI as previously described for one embodiment is an interface that allows multiple network layer control devices to learn about configuration of a remote switch including the ports and connections of the remote switch. Moreover, the interface causes connections on a remote switch to be established, changed, and deleted. Support of switch control by multiple independent controllers simultaneously is required to support the operation of different connection routing devices on the same switch. This allows, for example, connections set up by tag switching, PNNI, and AutoRoute™ to exist simultaneously on one switch. Simultaneous support of control by multiple independent controllers requires a method for apportioning resources between the controllers so that they may operate independently without conflict between each other. The VSI provides such a method by allowing each controller to control a different partition of resources. The control of different partitions of resources includes, but is not limited to: dividing the bandwidth available at each port between the partitions; dividing the VPI/VCI space available at each port between the partitions; and dividing the number of available connections in the switch between the partitions. Each controller is provided information only about the resources available in the partition assigned to that controller. The resource allocations will generally differ from partition to partition resulting in each controller seeing a different subset of switch resources; each controller thus sees a different virtual switch and a corresponding different virtual network. Resources may be, but are not limited to being, divided between partitions in a pre-assigned way, or they may be dynamically shared. In all cases, the switch controls the division of resources and informs the controllers of any changes to the assignment of resources. Independent operation of the controllers may allow addition of arbitrary numbers of different controllers.

As previously discussed, a VSI allows an arbitrary number of completely independent controllers to control an arbitrary number of completely independent subsets of the resources of a switch. An arbitrary number of controllers can control each switch. The controllers of a number of switches belong to an arbitrary number of distinct groups, although generally not more than one controller on each switch will belong to each group. The controllers of each separate group see completely independent subsets of a physical network. This VSI allows for partitioning of switch resources to allow simultaneous control of a switch by multiple independent controllers.

In order to get a view of the network each controller communicates with controllers of other switches. This results in different sets, or groups, of controllers having different views of the network. For each connection routing protocol there are sets of controllers, one controller per switch in one embodiment, and each set of controllers has a different view of the network.

The VSI provides a different view of the switch to each of the controllers, and the controllers communicate with each other in assembling their individual views of their switches, or the network topology. The controllers, in response to these communications, establish a network topology according to the connection routing protocol. The VSI in dealing with the communications between the controller and the switch, makes particular switch connections when requested by a controller.

Figure 12:
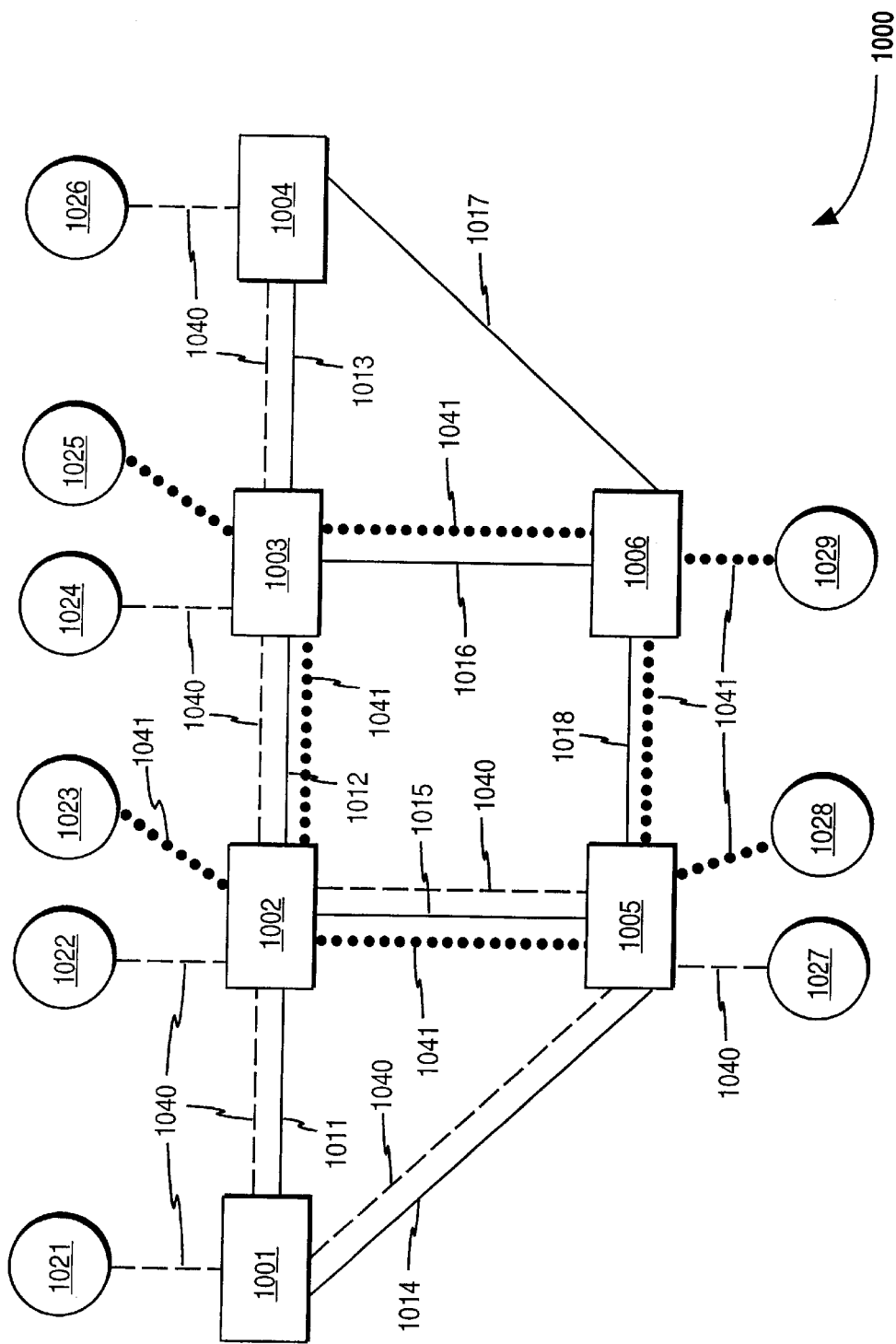
FIG. 12 is a network system in which each controller sees a different virtual switch resulting in a physical network having a number of virtual networks in one embodiment.

FIG. 12 is a network system in which a controller sees a different virtual switch resulting in a physical network having a number of virtual networks in one embodiment. A physical network 1000 comprises a number of remote switches 1001–1006 connected by trunks 1011–1018. The trunks 1011–1018 may be ATM trunks. Each switch 1001–1006 is coupled to at least one controller 1021–1029. Each switch VSI presents a different view to each controller coupled to that switch as to the resources of that switch that are available to the particular controller, thereby defining the virtual network that a particular controller can see.

For example, the VSI of switch 1001 causes controller 1021 to see the adjacent trunks in the virtual network defined by path 1040. The VSI of switch 1002 causes controller 1022 to see the adjacent trunks in the virtual network defined by path 1040. The VSI of switch 1003 causes controller 1024 to see the adjacent trunks in the virtual network defined by path 1040. The VSI of switch 1004 causes controller 1026 to see the adjacent trunks in the virtual network defined by path 1040. The VSI of switch 1005 causes controller 1027 to see the adjacent trunks in the virtual network defined by path 1040. Moreover, the group of controllers 1021, 1022, 1024, 1026, and 1027 communicate with each other, thereby learning of the paths of the virtual network 1040 seen by each other. Thus, the VSIs of switches 1001, 1002, 1003, 1004, and 1005 cause the group of controllers 1021, 1022, 1024, 1026, and 1027 each to see the virtual network defined by path 1040.

Similarly, the VSI of switch 1002 causes controller 1023 to see the adjacent trunks in the virtual network defined by path 1041. The VSI of switch 1003 causes controller 1025 to see the adjacent trunks in the virtual network defined by path 1041. The VSI of switch 1005 causes controller 1028 to see the adjacent trunks in the virtual network defined by path 1041. The VSI of switch 1006 causes controller 1029 to see the adjacent trunks in the virtual network defined by path 1041. Moreover, the group of controllers 1023, 1025, 1028, and 1029 communicate with each other, thereby learning of the paths of virtual network 1041 seen by each other. Thus, the VSIs of switches 1002, 1003, 1005, and 1006 cause the group of controllers 1023, 1025, 1028, and 1029 each to see the virtual network defined by path 1041.

As previously discussed, the Quality of Service (QoS) associated with a network switch defines the user-oriented end-to-end performance of ATM networks. The switch manufacturer or network provider states the QoS performance objectives in terms of a particular type or class of QoS. In an embodiment of the VSI, a network connection may be requested by a controller using any feasible QoS class, along with the parameters corresponding to those classes. The VSI has an expandable definition of service type that allows the QoS to be specified as ATM Forum Service Categories, an Internet Protocol (IP) Type of Service, a Tag Switching Type of Service, and priority service types. A connection can therefore be requested by the controller with any of these service classes. Furthermore, the VSI allows IP Types of Service to be mapped directly to switch components. Thus, the VSI of one embodiment allows an ATM connection to be established having a QoS specified directly as an IP Type of Service.

Figure 13:
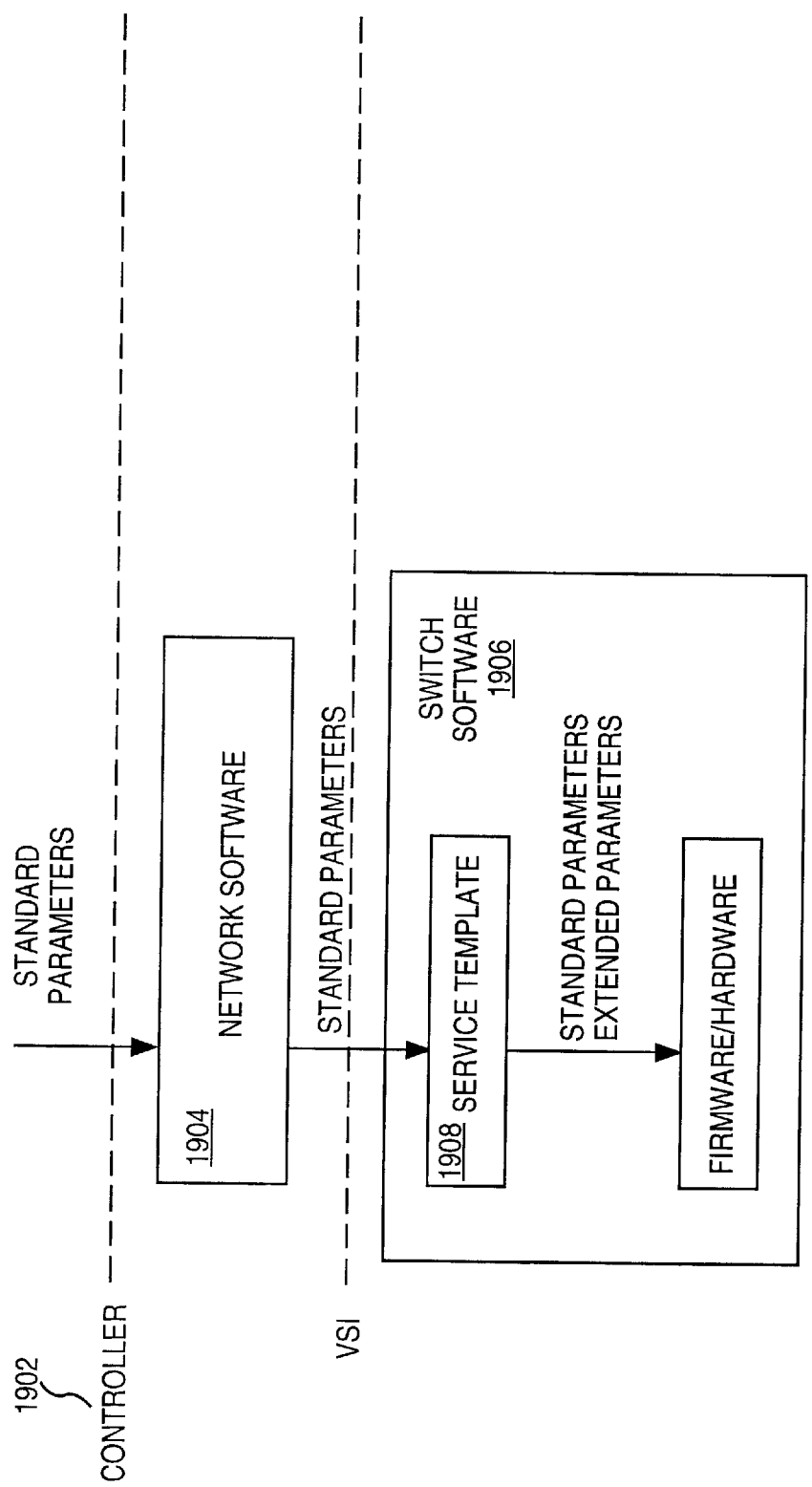
FIG. 13 shows the service template of one embodiment.

FIG. 13 shows the service template 1908 of one embodiment. The VSI allows extended QoS parameters in a corresponding switch to be accessed via one or more service templates. The controller 1902 and the network software 1904 support standard QoS parameters. The switch software 1906 supports standard QoS parameters as well as extended parameters. Extended parameters are parameters that are specific to the switch. A service template 1908 resident in the switch software 1906 contains a mapping that receives standard QoS parameters as an input and outputs standard and extended parameters. This service template 1908 allows the mapping to support specific switch parameters resident at a lower level in the network thereby allowing the network software 1904 to stay portable in supporting many interfaces.

At least four categories of messages are defined for use by the VSI. Connection requests allow the controller to request setup reserve, setup commit, teardown, execute diagnostics, or to get information on a connection segment in the switch. Connection request responses are messages that are responses to requests. Included in the connection request responses are connection setup and remove responses that include the updated load for the interfaces affected. Interface Information messages allow the controller to get interface (trunk and port) related information from the switch. Interface Information messages also allow the switch to asynchronously notify the controller of changes. Switch Information messages allow the controller to get switch related information from the switch. Switch Information messages also allow the switch to asynchronously notify the controller of changes. Error messages are generated when a message request cannot be satisfied. If a request cannot be satisfied, then the request is rejected and an error is sent back to the requester with information on the reason for the failure. Examples when a request cannot be satisfied include: when bandwidth resources are not available to support the call request; a request to add a connection between two endpoints when one is already in use; and a request which specifies changing the remote endpoint (logical interface or VPI/VCI) for a connection.

As previously discussed, the VSI is designed to support multiple controllers of a single switch. The controllers do not need any knowledge of each other nor do they need to know that the switch resources may be partitioned. The switch uses the controller identification in a message to identify the controller. The switch maintains the controller and partition mapping and provides individual views to each controller of only the resources allocated to that controller, which may include polled resources. Connection synchronization and switch information notification is provided per controller by the switch.

While one embodiment allows multiple masters to control connections on a VSI, the master is required to select the version of the VSI protocol used by the slaves. When a new slave is discovered by the master, or when the slave is restarted, the master reads the VSI protocol version that the slave can use and selects the best one. The master chooses the highest version that is common to all other slaves and the master. The master is required to alarm when the versions are incompatible. The slave is required to accept commands to change versions on the fly even if the change is to a lower version.

The concept of synchronization between the VSI master, or controller, and the slaves is that the master and the slave exchange database information to get into a known state, and then operate from this known state until an event causes an interruption in communication. Synchronization is only valid between the master and its associated slaves. The master owns all connection information and sends this to the slaves, while the slaves own all interface and switch information and send this to the master. The master detects the loss of synchronization and controls the resynchronization procedure.

The states of synchronization are Loss of Synchronization, Resynchronization Isolation, and Resynchronization Process. The master enters the Loss of Synchronization state when any of the following events occur: master restart; switch to redundant master; commands to slave do not get responses; master detects session identification change on an associated slave. The master maintains the synchronization state with each slave individually. When the master loses synchronization with one slave this does not imply that synchronization is lost with other slaves. It is also the case that the master may be in Loss Of Synchronization mode with multiple or even all slaves.

When the master detects Loss Of Synchronization mode, it may invoke the Resynchronization Isolation procedure to isolate the resynchronization need to a small subset of the connection data. The Resynchronization Isolation state is an optional state that is entered so the master can isolate which connections need to be re-downloaded. This process is a performance optimization step which becomes more important as the number of connections in the switch grows.

Resynchronization Isolation is made possible by associating connections into logical groupings and assigning a checksum component to each grouping. When synchronization is lost, the slave is queried for the checksum values associated with groups of connections (checksum blocks). Each checksum is compared to the master's copy and any differences are noted. Those checksums that do not match are passed to the Resynchronization Process. All connections associated with the non-matching checksums are determined to be in need of resynchronization.

Using checksum blocks across distributed slaves requires additional complexity on the master. Each connection has a checksum component and a checksum block specified. Since a connection may span two slaves, each slave maintains the checksum block value with only the ends of the connections that terminate on that slave. This means that the checksum block values for the same blocks are different at each slave. The master must compute and keep the checksum block values individually for each slave. Detection of checksum errors is therefore isolated to individual slaves. The detailed list of failing checksum blocks per slave is passed on to the Resynchronization Process.

The Resynchronization Process is the process of getting the master and the slaves back into synchronization, or resynchronizing, by transferring database information between them. This consists of the switch information comprising switch general information and interface information, and connection information.

Switch information is owned on the switch and uploaded to the master. This process is controlled by the master and consists of reading all of the information in a controlled manner. The master reads the general switch information and then reads all interface information using the get-more commands. This allows discovery all interfaces on the switch in a controlled manner.

Connection information is owned on the master and downloaded to the switch. All connection information is downloaded using connection groups. If no checksums are used, then all connections should be assigned to a single logical connection group. The download consists of sending the following sequence of states with actions: resync start; reassert all connections; resync end; retry negatively acknowledged connections.

The resync start message indicates to the slave that all connections on the specified checksum block should be marked as unverified. In the reassert all connections state, all connections in the checksum block are downloaded to the slave. The connections are sent as normal request messages, and the messages are no different from new connection requests. The slave accepts the connections just like normal connections which includes communicating with the appropriate other slaves. As each connection is acknowledged by the slave, it is also marked as verified in the slave. If a connection is negatively acknowledged, then the master puts it into a list to be re-tried later. Connections which are negatively acknowledged by the slave are not marked as verified in the slave.

The resync end state indicates to the slave that any connections on this checksum block which are still left in the unverified state are to be removed on this slave only. Note that the other end of the connection is not removed since Loss Of Synchronization is a per slave feature.

In the retry negatively acknowledged connections state, any connections that failed to be reasserted are retried by the master after the resync end message since the cleanup may have removed extra connections that prevented reasserting these. Any connections that remain negatively acknowledged are released by the controller through normal procedures.

If checksums are used and the Resynchronization Isolation has been performed, then the above message sequence is still used, but it applies only to specific checksum blocks. Note that the isolation could have determined that all blocks should be downloaded.

In the case of distributed slaves, resynchronizing a single slave involves sending the messages only to that slave. If a checksum block error spans multiple slaves, then all of the slaves are resynchronized at the same time. This involves sending the resync start and resync end messages to all slaves. The connection messages are only sent once to an appropriate slave or one that owns one of the interfaces. There is no need to send the same connection message to multiple slaves. The master and slaves can continue to process new connection requests during the resynchronization process.

Figure 14:
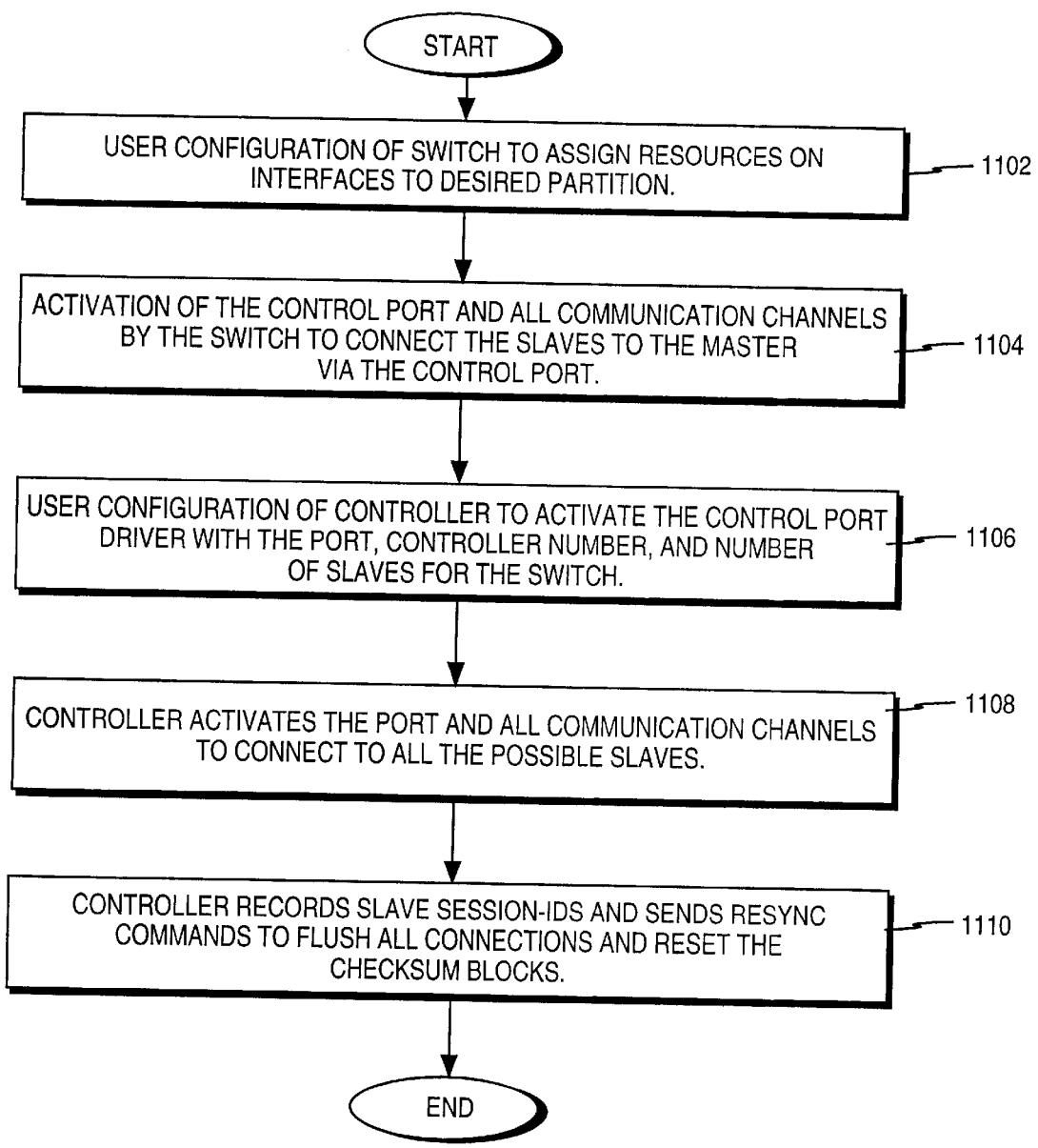
FIG. 14 is a flowchart for initially attaching and activating a controller and a switch in one embodiment.

FIG. 14 illustrates a flowchart for initially attaching and activating a controller and a switch in one embodiment. Operation begins at block 1102, at which the switch is configured to assign resources on interfaces to the desired partition. This configuration is accomplished by the user configuring the switch to activate a control port by specifying the port, the controller number that controls the port, and the partition it controls. At block 1104, the configured switch activates the control port and all communication channels to connect the slaves to the master via the control port. Upon connection, the slaves send switch information traps to the master with the session identification. The user configures the controller, at block 1106, to activate the control port driver with the port, controller number, and number of slaves for the switch. Upon configuration, the controller activates the port and all communication channels to connect to all the possible slaves, at block 1108. Upon connection to the slaves, the controller activates keep-alive signals to each slave. The controller detects slaves through traps and keep-alive responses. The master is required to perform a keep-alive function to detect when a slave cannot respond. The keep-alive is simply a request message which the slave responds to. This keep-alive message should be sent when no messages have been received from the slave in the configured time-out period. Detection of a slave keep-alive time-out results in the master marking that slave as unavailable. Subsequent connection messages for that slave are negatively acknowledged in the master. The keep-alive keeps trying the slave and detects when the slave has recovered. The slave may also send traps to the master which will indicate that is has recovered.

At block 1110, the controller records the session identifications of the slaves and sends resynchronization commands to flush all connections and reset the checksum blocks. The controller also sends a configuration command to each slave to enable traps, select the protocol version, and configure the trap acknowledge window size. Both controller and switch are now ready for connections.

Figure 15:
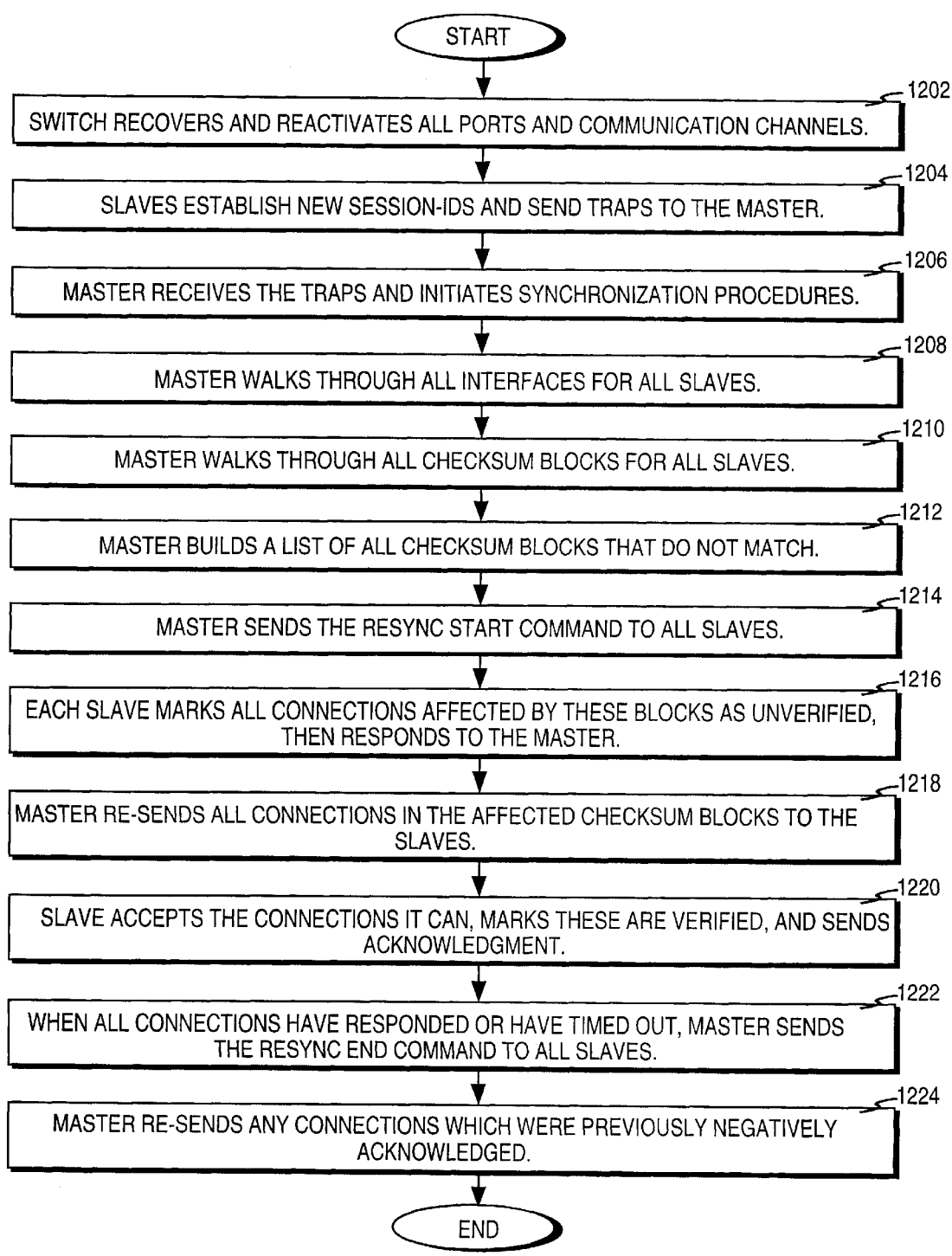
FIG. 15 is a flowchart for the resynchronization of a controller and a switch in one embodiment.

FIG. 15 illustrates a flowchart for the resynchronization of a controller and a switch in one embodiment. Resynchronization generally occurs anytime the controller and the switch get out of synchronization, for example, following a power cycle on the switch. The embodiment described in this flowchart reprograms the switch with the connection; however, depending on the outage time, the controller may release all of the connections.

Operation begins at block 1202, at which the switch recovers and reactivates all ports and communication channels. The slaves then establish new session-ids and send traps to the master, at block 1204. Upon receipt of the traps, the master initiates synchronization procedures, at block 1206. The master walks through all interfaces for all slaves using a get-more command, at block 1208. It should be noted that this step may be done after resynchronizing the connections. The get-more commands are used to walk though all of the objects of the particular data type without specifying each one. The first get-more command specifies an index for the starting object. The VSI-slave responds with a message containing data for the first N interfaces, a flag indicating whether there are more interfaces to read, and an index of the next interface to read. The VSI-master then requests another group of interfaces using the get-more-interfaces command with the next interface index passed. This process continues until the response contains the flag set to false, indicating this message contains the last interface. In the case of a distributed slave, the get-more applies only per slave. The VSI-master should hide the details of multiple slaves from the higher layer by transparently spanning the slaves.

The master then walks through all checksum blocks for all slaves using the get-more commands, at block 1210. At block 1212, a list is built by the master that contains the checksum blocks that do not match.

The mater sends the resynchronization start command to all slaves, at block 1214; this command includes the list of checksum blocks that failed or the command may specify all blocks. Each slave then responds to the master after marking all connections affected by these failed checksum blocks as unverified, at block 1216. The master re-transmits all connections in the affected checksum blocks to the slaves, at block 1218. Upon receipt of the connections, the slave accepts the connections and marks them as verified, at block 1220. The slave then sends an acknowledgment to the master. If the connections cannot be accepted by the slave, the slave sends a negative acknowledgment command to the master, and the master records all such connections. When all connections have responded or have timed out more times than a retransmit count, the master sends the resynchronization end command to all slaves, at block 1222, which causes each slave to remove the local end of any unverified connections. At block 1224, the master retransmits any connections that were previously negatively acknowledged; any that still fail are deleted on the switch and released.

Figure 16:
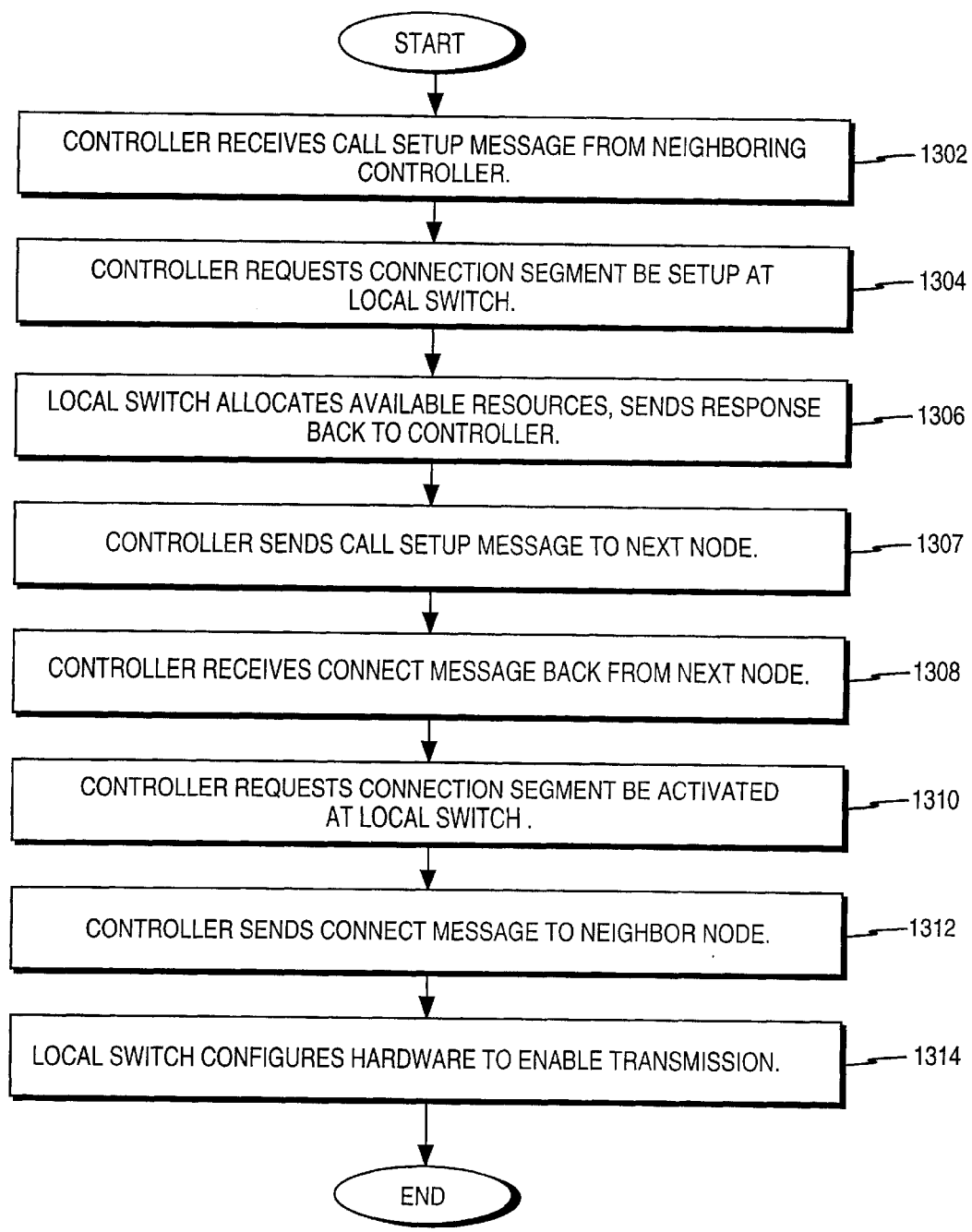
FIG. 16 is a flowchart for a controller routing a connection segment across a switch in one embodiment.

FIG. 16 is a flowchart for a controller routing a connection segment across a switch in one embodiment. Operation begins at block 1302, at which the controller receives a call setup message from a neighboring controller. At block 1304, the controller requests that a connection segment be setup or reserved at a local switch by sending a call setup command to the next node. The local switch allocates resources, if resources are available, and sends a response back to the requesting controller, at block 1306. The response includes the updated loading for the switch interfaces. At block 1307, the controller sends a call setup message to the next node. At block 1308, the controller receives a connect message back from the next node. The controller requests the activation or confirmation of a connection segment at the local switch, at block 1310. The controller sends a connect message to the neighboring node, at block 1312. In another embodiment, the controller requests the activation or confirmation of a connection segment at the local switch concurrently with sending a connect message to the neighboring node.

The local switch then configures the switch hardware to enable transmission, at block 1314.

Figure 17:
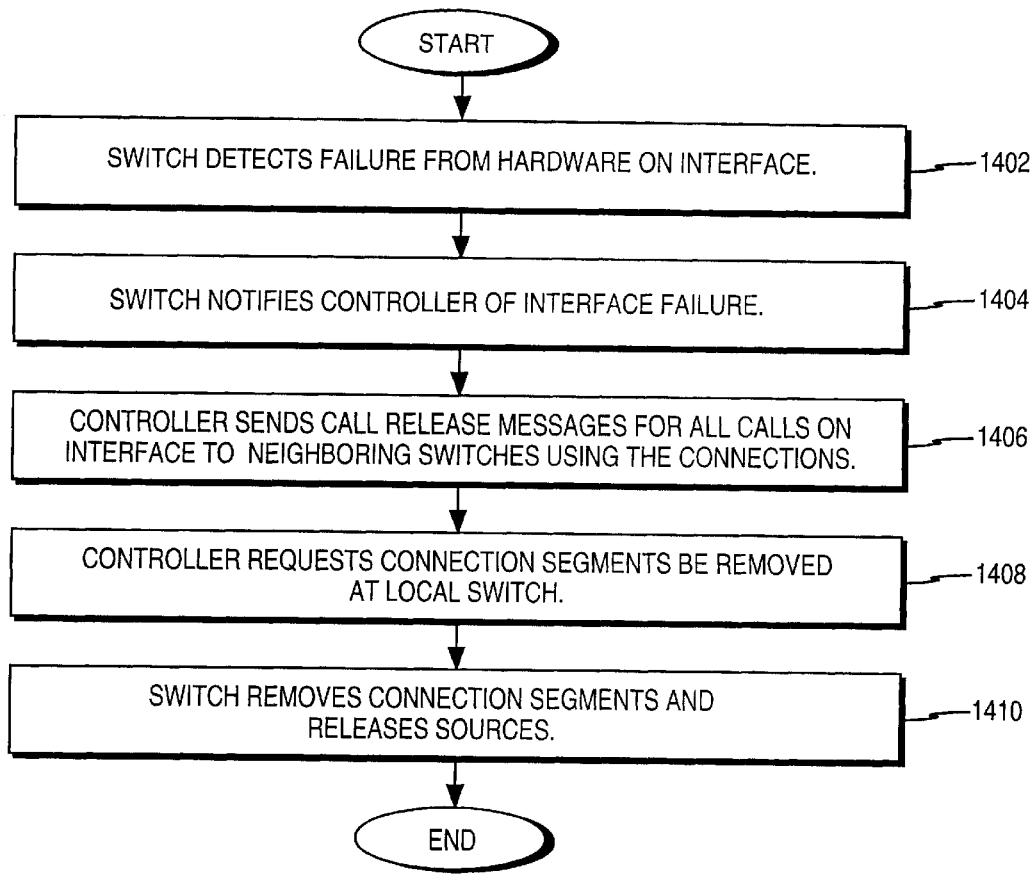
FIG. 17 is a flowchart for an switch interface failure invoking a connection teardown in one embodiment.

FIG. 17 is a flowchart for a switch interface failure invoking a connection teardown in one embodiment. Operation begins at block 1402, at which the switch detects a failure from hardware on the switch interface. At block 1404, the switch notifies the associated controller of the interface failure. The controller sends call release messages for all calls on the interface to neighboring switches of the network using the connections, at block 1406. The controller requests the removal of connection segments at the local switch, at block 1408. Even though the connections have already been deleted on the failed interface, this step is necessary to remove the connection segments from the other interface which remains active. The switch then removes the connection segments and releases the associated resources, at block 1410. A response is also sent back to the controller indicating an updated loading for the affected interfaces.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for controlling a switch comprising:
   providing a plurality of switch resource partitions to a plurality of independent controllers from the switch;
   controlling connections of the switch using the plurality of switch resource partitions of the plurality of independent controllers.

2. The method of claim 1, wherein controlling connections comprises controlling at least one switch interface.

3. The method of claim 2, wherein each of the plurality of independent controllers comprises at least one switch interface master component, and wherein the switch comprises at least one switch interface slave component.

4. The method of claim 3, wherein controlling connections comprises controlling at least one switch interface slave component using the at least one switch interface master component.

5. The method of claim 4, wherein the at least one switch interface slave component is hosted on a different processor than the at least one switch interface master component.

6. The method of claim 5, wherein each of the at least one switch interface slave components is hosted on one of a plurality of processors, each of the plurality of processors controlling at least one port card of the switch.

7. The method of claim 5, wherein the switch comprises a plurality of switch interface slave components, wherein at least one of the plurality of switch interface slave components is hosted on a control card, the control card controlling a plurality of port cards of the switch, and wherein at least one of the plurality of switch interface slave components is hosted on at least one processor of at least one port card of the switch.

8. The method of claim 1, wherein the plurality of switch resource partitions comprises a plurality of subsets of switch resources.

9. The method of claim 8, wherein the plurality of subsets of switch resources defines a plurality of independent subset networks of a physical network, each of the plurality of independent subset networks controlled by the each of a plurality of groups of independent controllers.

10. The method of claim 8, further comprising the switch allocating a fixed partition of bandwidth to each of the plurality of independent controllers.

11. The method of claim 8, further comprising the switch dynamically sharing bandwidth allocation between each of the plurality of independent controllers.

12. The method of claim 8, wherein the plurality of switch resource partitions comprises a number of available connections in the switch.

13. The method of claim 8, wherein the plurality of switch resource partitions comprises at least one virtual path identifier and at least one virtual circuit identifier available at each of a plurality of ports.

14. The method of claim 1, further comprising each of the plurality of independent controllers using at least one of a plurality of connection routing protocols, the at least one of a plurality of connection routing protocols, the at least one of a plurality of connection routing protocols comprising a network software level control system.

15. The method of claim 14, wherein the at least one of a plurality of connection routing protocols comprises automatic connection routing.

16. The method of claim 14, wherein the at least one of a plurality of connection routing protocols comprises PNNI.

17. The method of claim 14, wherein the at least one of a plurality of connection routing protocols comprises tag switching.

18. The method of claim 1, further comprising each of a plurality of independent controllers requesting connections having at least one Quality of Service parameter.

19. The method of claim 18, wherein the at least one Quality of Service parameter comprises an ATM Forum service class, an Internet Protocol Type of Service class, a tag switching service class, and a priority service class.

20. The method of claim 19, wherein an Internet Protocol Type of Service class is specified for an ATM connection.

21. The method of claim 18, wherein the at least one Quality of Service parameter is used with at least one other ATM parameter to generate extended switch parameters.

22. The method of claim 1, further comprising resynchronizing the switch and each of the plurality of independent controllers when discrepancies are detected between the connections on the switch and those expected by the each of the plurality of independent controllers.

23. The method of claim 22, wherein a checksum component is associated with each connection, an error in the checksum component indicating a discrepancy between the connections.

24. The method of claim 23, wherein the resynchronization comprises reestablishing connections in which the checksum component is in error.

25. The method of claim 1, wherein the switch supports asynchronous transfer mode (ATM) interfaces in a network.

26. The method of claim 1, wherein the switch supports frame relay interfaces, voice interfaces, and data interfaces in a network.

27. The method of claim 1, wherein controlling switch connections comprises each of the plurality of independent controllers controlling at least one port card of the switch.

28. The method of claim 1, further comprising synchronizing the switch and each of the plurality of independent controllers, the synchronizing comprising exchanging database information for a known state.

29. The method of claim 1, wherein the switch is a ATM switch.

30. The method of claim 1, wherein the switch is a packet switch.

31. The method of claim 1, wherein the switch is a circuit switch.

32. An apparatus for controlling a switch in a network, the apparatus comprising:
  a first component that provides one of a plurality of switch resource partitions of the switch to each of a plurality of independent controllers;
  a second component in each of the plurality of independent controllers that independently control connections in the switch using the one of a plurality of switch resource partitions.

33. The apparatus of claim 32, wherein the first component comprises at least one switch interface slave component, and wherein the second component comprises at least one switch interface master component.

34. The apparatus of claim 33, wherein the at least one switch interface slave component is hosted on a different processor than the at least one switch interface master component.

35. The apparatus of claim 34, wherein each of the at least one switch interface slave components is hosted on one of a plurality of processors, each of the plurality of processors controlling at least one port card of the switch.

36. The apparatus of claim 32, wherein the apparatus supports connections among a plurality of types of interfaces.

37. The apparatus of claim 36, wherein the apparatus supports connections between a first endpoint having a first interface type and a second endpoint having a second interface type, wherein the first interface type is different from the second interface type.

38. The apparatus of claim 36, wherein the apparatus supports asynchronous transfer mode (ATM) interfaces.

39. The apparatus of claim 36, wherein the apparatus supports frame relay connections, voice connections, and circuit emulation connections.

40. The apparatus of claim 32, wherein each of the plurality of independent controllers uses at least one of a plurality of connection routing protocols, the at least one of a plurality of connection routing protocols comprising a network software level control system.

41. The apparatus of claim 32, wherein the plurality of switch resource partitions comprises a plurality of subsets of switch resources, the plurality of subsets of switch resources defining a plurality of independent subset networks of a physical network, each of the plurality of independent subset networks controlled by each of a plurality of groups of independent controllers.

42. The apparatus of claim 32, wherein each of the plurality of independent controllers controls at least one port card of the switch.

43. The apparatus of claim 32, wherein the states of the switch and each of the plurality of independent controllers are synchronized by the exchange of database information.

44. The apparatus of claim 32, wherein the switch and each of the plurality of independent controllers are resynchronized when discrepancies are detected between the connections on the switch and those expected by each of the plurality of independent controllers, wherein the resynchronization comprises reestablishing a connection in which a checksum component is in error.

45. The apparatus of claim 32, wherein each of the plurality of independent controllers support connections having at least one Quality of Service parameter.

46. A system comprising a switch having a switch interface, the switch interface configured to:
provide a plurality of subsets of switch resources of the switch to a plurality of independent controllers;
independently control connections of the switch using the plurality of subsets of switch resources.

47. The system of claim 46, wherein the switch interface comprises at least one switch interface slave component and at least one switch interface master component.

48. The system of claim 47, wherein the at least one switch interface slave component is hosted on a different processor than the at least one switch interface master component.

49. The system of claim 48, wherein each of the at least one switch interface slave components is hosted on one of a plurality of processors, each of the plurality of processors controlling at least one port card of the switch.

50. The system of claim 46, wherein the system supports connections among a plurality of types of interfaces.

51. The system of claim 50, wherein the system supports connections between a first endpoint having a first interface type and a second endpoint having a second interface type, wherein the first interface type is different from the second interface type.

52. The system of claim 50, wherein the system supports asynchronous transfer mode connections.

53. The system of claim 50, wherein the system supports frame relay connections, voice connections, and circuit emulation connections.

54. The system of claim 46, wherein the plurality of subsets of switch resources define a plurality of independent subset networks of a physical network, each of the plurality of independent subset networks controlled by each of the plurality of groups of independent controllers.

55. The system of claim 46, wherein each of the plurality of independent controllers controls at least one port card of the switch.

56. The system of claim 46, wherein the switch and each of the plurality of independent controllers are synchronized by exchanging database information for a known state.

57. The system of claim 46, wherein connections are reestablished between the switch and any of the plurality of independent controllers when discrepancies are indicated between expected connections of the any of the plurality of independent controllers and the corresponding subset of switch resources of the switch.

58. The system of claim 46, wherein the each of a plurality of independent controllers support connections having a plurality of Quality of Service parameters.

59. A computer readable medium containing executable instructions which, when executed in a processing system, causes the system to perform the steps for controlling a switch comprising the steps of:
providing a plurality of switch resource partitions to a plurality of independent controllers from the switch;
controlling connections of the switch using the plurality of switch resource partitions of the plurality of independent controllers.

60. The computer readable medium of claim 59, further causing the system to control each of the plurality of independent controllers comprising at least one switch interface master component, wherein the switch comprises at least one switch interface slave component.

61. The computer readable medium of claim 60, wherein the at least one switch interface slave component is hosted on a different processor than the at least one switch interface master component.

62. The computer readable medium of claim 61, wherein each of the at least one switch interface slave components is hosted on one of a plurality of processors, each of the plurality of processors controlling at least one port card of the switch.

63. The computer readable medium of claim 59, further causing the system to control each of the plurality of independent controllers using at least one of a plurality of connection routing protocols.

64. The computer readable medium of claim 59, further causing the plurality of switch resource partitions to comprise a plurality of subsets of switch resources, the plurality of subsets of switch resources defining a plurality of independent subset networks of a physical network, each of the plurality of independent subset networks controlled by the each of a plurality of independent controllers.

65. The computer readable medium of claim 59, further causing the system to perform the step of synchronizing the switch and each of the plurality of independent controllers.

66. The computer readable medium of claim 59, further causing the system to perform the step of resynchronizing the switch and each of the plurality of independent controllers when discrepancies are detected between the connections on the switch and those expected by the each of the plurality of independent controllers.

67. The computer readable medium of claim 59, further causing each of the plurality of independent controllers to support connections having a plurality of Quality of Service parameters, the plurality of Quality of Service parameters comprising an ATM Forum service class and an Internet Protocol Type of Service class.

68. An apparatus for controlling a switch in a network, the apparatus comprising:
first means for providing one of a plurality of switch resource partitions of the switch to each of a plurality of independent controllers;
second means in each of the plurality of independent controllers for independently controlling connections in the switch using one of a plurality of switch resource partitions.

* * * * *